(12) United States Patent
Chujo et al.

(10) Patent No.: US 7,680,402 B2
(45) Date of Patent: Mar. 16, 2010

(54) IMAGE SHOOTING DEVICE WITH CAMERA SHAKE CORRECTION FUNCTION

(75) Inventors: Kaoru Chujo, Kawasaki (JP); Takashi Wakamatsu, Kawasaki (JP); Takehiro Nakai, Kawasaki (JP); Akifumi Izumisawa, Kawasaki (JP); Yasuhiro Kawakatsu, Kawasaki (JP); Masayuki Hirose, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 518 days.

(21) Appl. No.: 11/562,702

(22) Filed: Nov. 22, 2006

(65) Prior Publication Data
US 2007/0242936 A1    Oct. 18, 2007

(30) Foreign Application Priority Data
Apr. 18, 2006 (JP) ............................. 2006-115050
Sep. 27, 2006 (JP) ............................. 2006-261815

(51) Int. Cl.
*G03B 17/00* (2006.01)
*H04N 5/228* (2006.01)
(52) U.S. Cl. ..................................... 396/55; 348/208.4
(58) Field of Classification Search .................. 396/53, 396/55; 348/208.3, 208.4, 208.5, 208.6, 348/208.13
See application file for complete search history.

(56) References Cited

U.S. PATENT DOCUMENTS 7,468,743 B2 * 12/2008 Washisu ................... 348/208.1

2005/0162535 A1 * 7/2005 Lee et al. ..................... 348/241
2006/0216010 A1 * 9/2006 Yamanouchi et al. ......... 396/55

FOREIGN PATENT DOCUMENTS

| JP | 4-10870 | * | 1/1992 |
| JP | 2000-299813 | | 10/2000 |
| JP | 2002-247444 | | 8/2002 |
| JP | 2004-266648 | | 9/2004 |
| JP | 2004-279514 | | 10/2004 |

OTHER PUBLICATIONS

Partial English translation of Japanese Patent Publication No. 2002-247444, published Aug. 30, 2002.
Office Action issued Sep. 5, 2008 in corresponding Chinese Patent Application No. 200610164668.5.

* cited by examiner

*Primary Examiner*—Kenneth J Whittington
(74) *Attorney, Agent, or Firm*—Staas & Halsey LLP

(57) ABSTRACT

An image shooting device with a camera shake correction function is provided. The image shooting device is capable of avoiding the deterioration of image quality due to performing camera shake correction. An image shooting control unit of the image shooting device can be configured to select to take in either one piece of image data for ordinary image shooting or a plurality of pieces of image data for camera shake correction, on the basis of the determination result of a determination unit. It also can be configured to take in both one piece of image data for ordinary image shooting and a plurality of pieces of image data for camera shake correction.

7 Claims, 27 Drawing Sheets

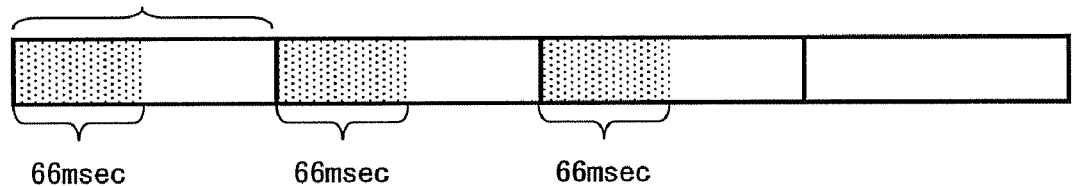
F I G. 2 B

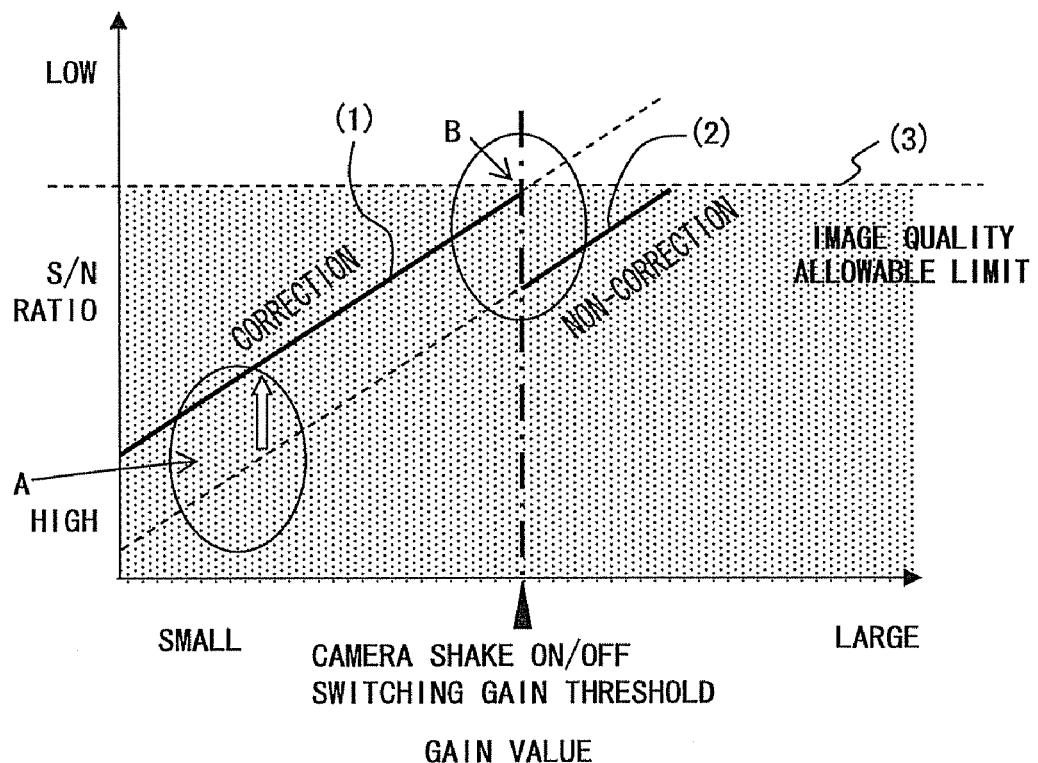
F I G. 4

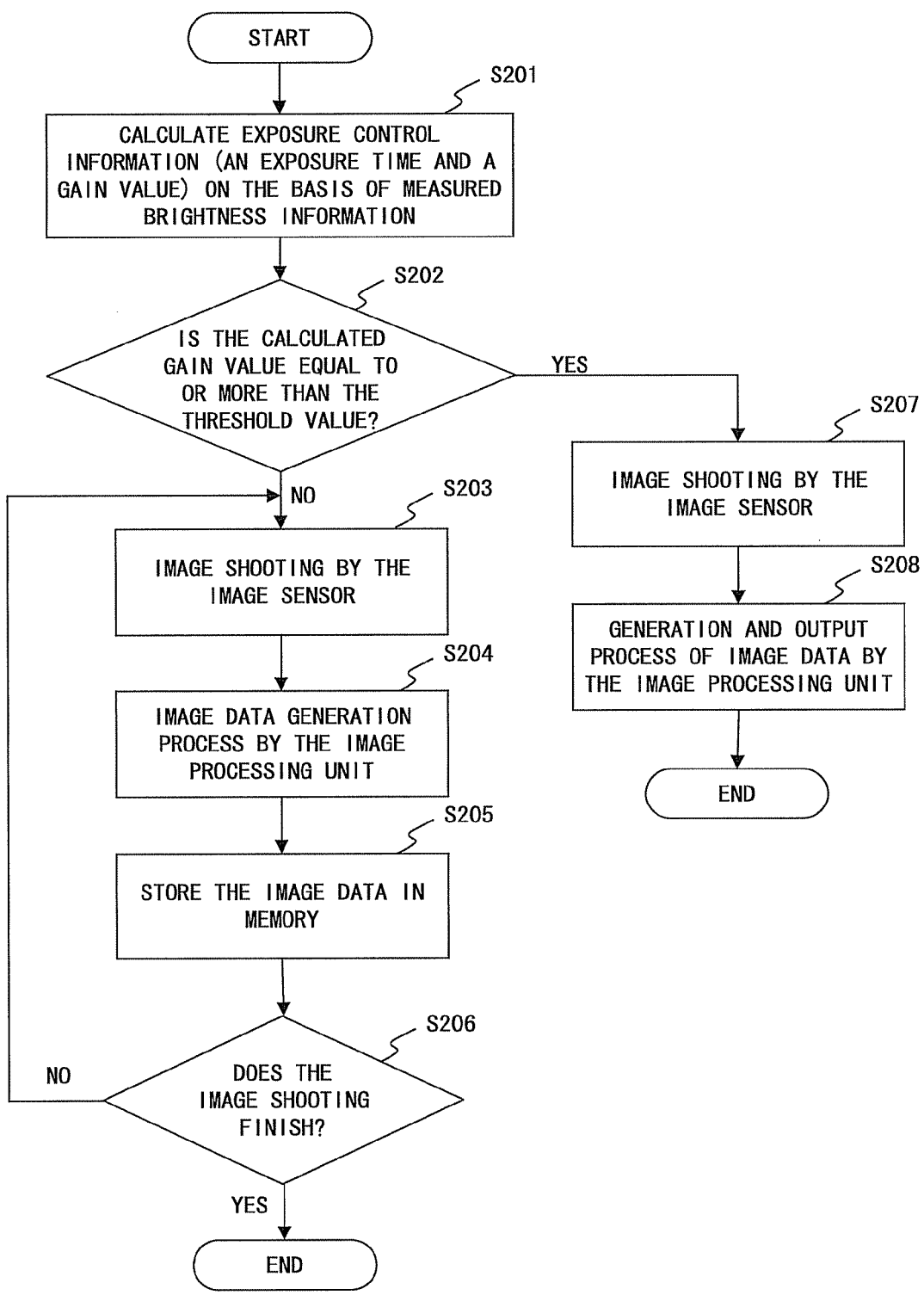
F I G. 5

| ZOOM MAGNIFICATION (z) | z=1 | 1<z≦2 | 2<z≦4 | 4<z≦8 |
|---|---|---|---|---|
| EXPOSURE TIME THRESHOLD (th) | n | n/2 | n/4 | n/8 |

F I G. 7

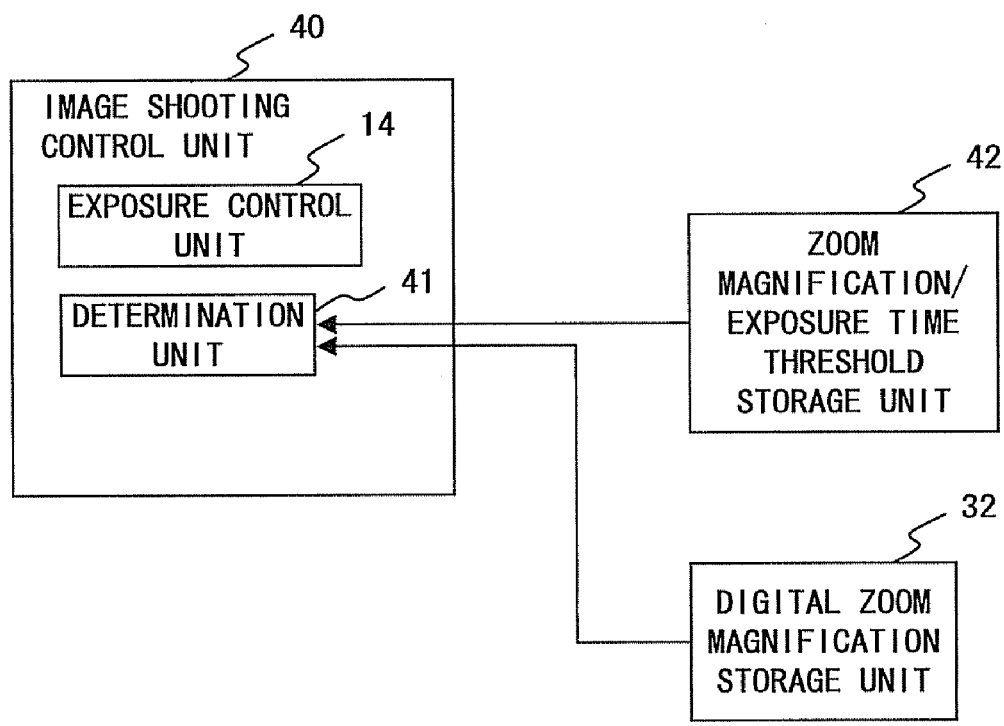
F I G. 9

| ZOOM MAGNIFICATION (z) | z=1 | 1<z≦2 | 2<z≦4 | 4<z<6 | 6≦z≦8 |
|---|---|---|---|---|---|
| EXPOSURE TIME THRESHOLD (th) | n | n/2 | n/4 | n/8 | m |

F I G. 1 1

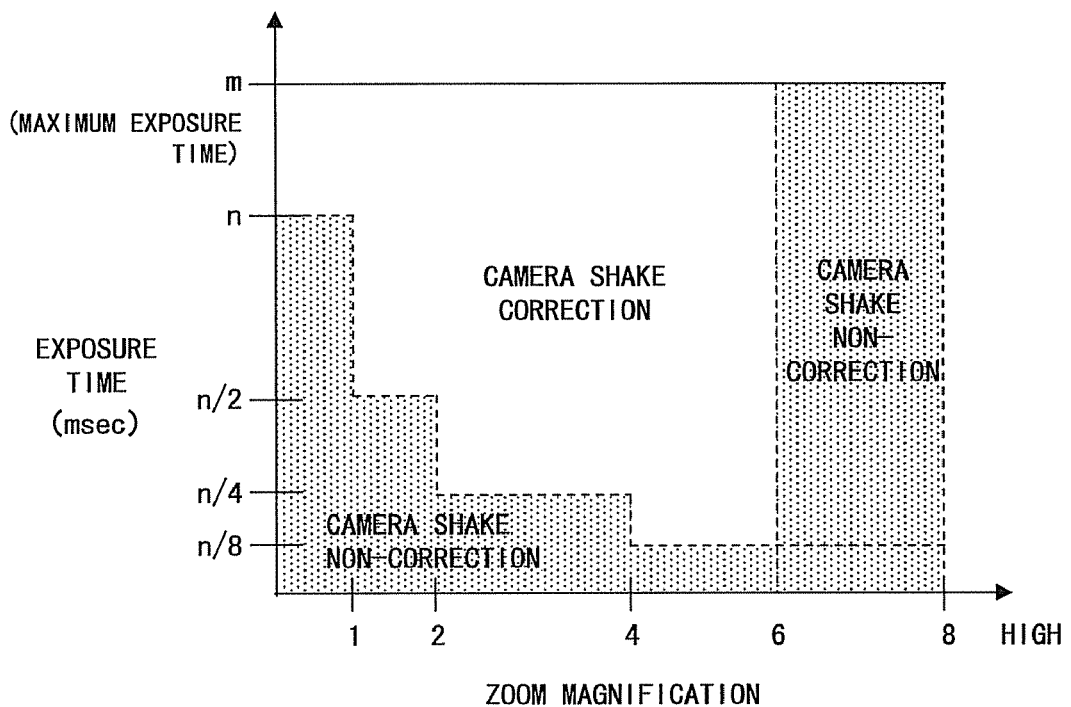
F I G. 1 2

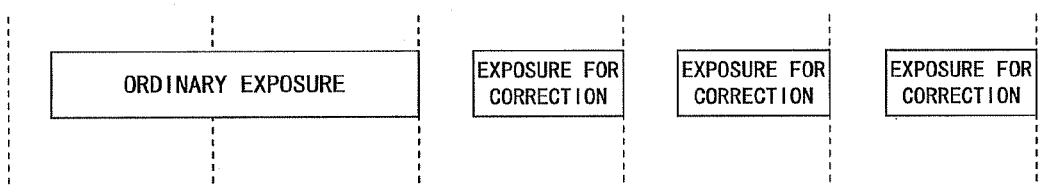
F I G. 1 3 A
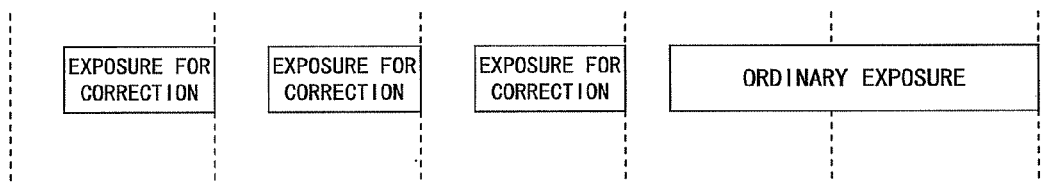
F I G. 1 3 B

| USER'S ACTION | SCREEN DISPLAY |
|---|---|
| (1) PUSH THE CAMERA BUTTON | (1) DISPLAY THE CAMERA FINDER |
| (2) PUSH THE SHUTTER BUTTON | (2) CANCEL THE CAMERA FINDER |
| (3) CHECK A DISPLAYED IMAGE<br>• WHEN DESIRING TO STORE IT,<br>   PUSH THE DETERMINATION BUTTON<br>• WHEN DISPLAYING A SUBSEQUENT IMAGE,<br>   PUSH THE "⇒" BUTTON | DISPLAY AN ORDINARILY SHOT IMAGE<br>DISPLAY CAMERA SHAKE-CORRECTED IMAGE |

FIG. 16

| USER'S ACTION | SCREEN DISPLAY |
|---|---|
| (1) PUSH THE CAMERA BUTTON | (1) DISPLAY THE CAMERA FINDER |
| (2) PUSH THE SHTTER BUTTON | (2) CANCEL THE CAMERA FINDER |
| (3) CHECK A DISPLAYED IMAGE AND DETERMINE WHETHER TO CORRECT CAMERA SHAKE<br>• WHEN DESIRING TO STORE IT, PUSH THE DETERMINATION BUTTON<br>• WHEN CORRECTING CAMERA SHAKE, PUSH THE "↓" BUTTON<br>• WHEN CORRECTING NO CAMERA SHAKE, PUSH THE CLEAR BUTTON | DISPLAY AN ORDINARILY SHOT IMAGE |
| (4) CHECK A DISPLAYED IMAGE AND DETERMINE WHETHER TO STORE IT<br>• WHEN DESIRING TO STORE IT, PUSH THE DETERMINATION BUTTON<br>• WHEN DISPLAYING A SUBSEQUENT IMAGE, PUSH THE "⇒" BUTTON | DISPLAY CAMERA SHAKE-CORRECTED IMAGE<br>DISPLAY AN ORDINARILY SHOT IMAGE |

F I G. 1 8

| USER'S ACTION | SCREEN DISPLAY |
|---|---|
| (1) PUSH THE CAMERA BUTTON | (1) DISPLAY THE CAMERA FINDER |
| (2) PUSH THE SHUTTER BUTTON | (2) CANCEL THE CAMERA FINDER |
| (3) CHECK A DISPLAYED IMAGE AND DETERMINE WHETHER TO CORRECT CAMERA SHAKE<br>· WHEN DESIRING TO STORE IT, PUSH THE DETERMINATION BUTTON<br>· WHEN DISPLAYING CAMERA SHAKE-CORRECTED IMAGE, PUSH THE "↓" BUTTON | DISPLAY AN ORDINARILY SHOT IMAGE |
| (4) CHECK A DISPLAYED IMAGE AND DETERMINE WHETHER TO STORE IT<br>· WHEN DESIRING TO STORE IT, PUSH THE DETERMINATION BUTTON<br>· WHEN DISPLAYING A SUBSEQUENT IMAGE, PUSH THE "⇒" BUTTON | DISPLAY CAMERA SHAKE-CORRECTED IMAGE<br>DISPLAY AN ORDINARILY SHOT IMAGE |

FIG. 20

IMAGE SHOOTING DEVICE WITH CAMERA SHAKE CORRECTION FUNCTION

BACKGROUND OF THE INVENTION

1. Field of the Invention

The present invention relates to an image shooting device with a camera shake correction function, a camera shake correction method and a storage medium recording a pre-process program for camera shake correction process, and more particularly to a image shooting device with a camera shake correction function, a camera shake correction method and a storage medium recording a pre-process program for camera shake correction process which are capable of avoiding the degradation of an image by correcting its camera shake.

2. Description of the Related Art

When taking a picture using digital camera (image shooting device) built in a cellular phone or the like, for example, the vibration of a hand carrying the cellular phone during an exposure time affects an image to be taken in. In order to suppress this influence of the hand vibration, camera shake correction is applied to the taken image.

Recently, digital cameras, more particularly digital cameras mounted on cellular phones have been spread with remarkable speed. Requirements for the performance and serviceability of a digital camera by users have also increased.

In response to such requirements, as to the performance, high pixels and the high zoom magnification have remarkably progressed and as to the serviceability, small size and light weight have remarkably progressed.

However, the improvement of these performance/serviceability in turn has easily caused a blur due to such camera shake. More particularly, in the case of a digital camera mounted on a cellular phone, since it is always carried, for example, pictures are often taken in a very dark place. However, no flash is often mounted. Therefore, in this case, a blur due to camera shake is easy to occur compared with other digital cameras.

As method for coping with the camera shake, an optical image correction method and an image correction method by a digital process have been proposed.

In general digital cameras, the optical image correction method is already commercialized, and in digital cameras mounted on cellular phones, the commercialization of the image correction method by the digital process has just started.

As other camera shake correction methods, for example, the methods disclosed by Patent references 1 and 2 are known.

Patent reference 1 discloses a technology of automatically improving shutter speed and sensitivity (a gain value) by n times, shooting images for n frames at one time and obtaining image data whose camera shake is corrected on the basis of n pieces of image data obtained by the series of imaging.

Patent reference 2 discloses a technology of shooting a plurality of images in an exposure time shorter than a camera shake limit exposure time if the calculated appropriate exposure time is expected to be longer than the camera shake limit exposure time.

Patent reference 3 discloses an image processing device for correcting the camera shake of an image shot by an image shooting device. This image processing device comprises a consecutive image shooting unit for consecutively shooting an object in prescribed time intervals and obtaining a plurality of images, a camera shake detection unit for detecting camera shake information about the camera shake of the image shooting device according to the timing of the consecutive image shooting and a camera shake correction unit for correcting the camera shake of at least one of a plurality of images shot by the consecutive image shooting unit on the basis of the camera shake information corresponding to each image detected by the camera shake detection unit and the plurality of images. Thus, the image shooting device can shoot scenes intended by a photographer while correcting its camera shake with high accuracy in high speed.

In the electronic camera with consecutive image shooting function disclosed by Patent reference 4, camera shake information indicating the detection result of camera shake state at the time of consecutive image shooting from an angular velocity sensor is stored in RAM and also when the file of consecutive image data obtained at the time of consecutive image shooting is recorded on a memory card, the camera shake information is attached and recorded. When reproducing the consecutive images recorded on the memory card, camera shake correction is performed on the basis of the attached camera shake information. Thus, an electronic camera with a camera shake correction function to maintain high image quality can be provided with no complex structure.

Patent reference 1: Japanese patent Publication No. 2004-266648 "Camera Shake Correction Apparatus and Camera Shake Correction Program"

Patent reference 2: Japanese patent Publication No. 2004-279514 "Camera Shake Compensation Device"

Patent reference 3: Japanese patent Publication No. 2002-247444 "Image Processor and Recording Medium For Recording Image Processing Program"

Patent reference 4: Japanese patent Publication No. 2000-299813 "Electronic Image Pickup Device"

SUMMARY OF THE INVENTION

It is an object of the present invention to provide an image shooting device with a camera shake correction function capable of avoiding the degradation of image quality due to camera shake correction and due to no camera shake correction and its camera shake correction method.

It is another object of the present invention to provide an image shooting device with a camera shake correction function capable of obtaining images with good image quality in which the influence of camera shake is suppressed and its camera shake correction method.

The image shooting device with a camera shake correction function in the first aspect of the present invention comprises an image sensor for converting light received from an object to be shot for a specified exposure time into electric charges and outputting the photo-electrically converted data, an image data generation unit for generating image data on the basis of the photo-electrically converted data, an image shooting control unit for outputting exposure control information to the image sensor according to an imaging instruction and taking in one or more pieces of image data and a correction unit for generating one piece of image data whose camera shake is corrected on the basis of the plurality of pieces of taken-in image data.

The image shooting device with a camera shake correction function in the second aspect of the present invention is the image shooting device in the first aspect and further comprises an exposure control unit for calculating the exposure time and a gain value indicating how much the photo-electrically converted data should be amplified as exposure control information and a determination unit for determining whether the calculated gain value is equal to or more than a predetermined threshold. If it is determined that the gain value is equal to or more than the threshold, the image shooting control unit takes in the image data. If it is determined that the gain value falls below the threshold, the image shooting control unit takes in a plurality of pieces of image data for camera shake correction.

In this case, if the total exposure time obtained by adding the exposure time of each piece of image data in a plurality of times of image shooting is equal to the exposure time of one time of image shooting, the S/N ratio of the image data whose camera shake is corrected, which is obtained on the basis of the plurality of pieces of image data (for camera shake correction) obtained by the plurality of times of image shooting, is lower than the S/N ratio of one piece of image data (for ordinary image shooting) obtained by one time of image shooting.

In such a case, in an area where image quality deteriorates (area with a high gain value), visually better image quality can be obtained when using the one piece of image data obtained by one time of image shooting in the exposure time obtained by adding the exposure time of each piece of image data in a plurality of times of image shooting, without applying any process to it than when suppressing the influence of camera shake by using the image data (whose camera shake is corrected) obtained from the plurality of consecutive images.

Specifically, by setting a gain value in the neighborhood where the S/N ratio of an image obtained by combining the plurality of consecutive images becomes equal to or less than its image quality allowance limit and deteriorates as a threshold and the determination unit determining whether to shoot consecutive images (correct camera shake), depending on whether the calculated gain value is equal to or more than the threshold, the quality of an image with a low S/N ratio (high gain value) can be improved, thereby avoiding the deterioration of image quality due to camera shake correction.

The image shooting device with a camera shake correction function in the third aspect of the present invention is the image shooting device in the first aspect and further comprises an exposure control unit for calculating the exposure time and a gain value indicating how much the photo-electrically converted data should be amplified as exposure control information and a determination unit for determining whether a set digital zoom magnification value is equal to or more than a predetermined threshold. If it is determined that the digital zoom magnification value is equal to or more than the threshold, the image shooting control unit takes in one piece of image data for general image shooting. If it is determined that the digital zoom magnification value is less than the threshold, the image shooting control unit takes in a plurality of pieces of image data for camera shake correction.

In this case, when the digital zoom magnification increases to more than some extent, sometimes the extraction accuracy of feature points used for position matching in the image decreases remarkably because of a magnifying process of the image according to the magnification. Thus, when obtaining image data whose camera shake is corrected by overlapping each piece of image data obtained by a plurality of times of image shooting, sometimes a blur due to the overlapping expands and as a result, the quality of a corrected image deteriorates remarkably.

Therefore, a threshold is set in the digital zoom magnification and if the set digital zoom magnification value is equal to or more than the threshold, the image is shot only one time and no camera shake is corrected. If the set digital zoom magnification value is smaller than the threshold, the image is shot a plurality of times and its camera shake is corrected. Thus, if the digital zoom magnification increases to more than some extent, the quality of a combined image obtained by overlapping each image obtained by consecutively shooting an object can be avoided from deteriorating remarkably.

The image shooting device with a camera shake correction function in the fourth aspect of the present invention is the image shooting device in the first aspect and further comprises an exposure control unit for calculating the exposure time and a gain value indicating how much the photo-electrically converted data should be amplified, an exposure time threshold acquisition unit for obtaining the threshold of an exposure time corresponding to a set digital zoom magnification on the basis of a zoom magnification/exposure time threshold storage unit for storing the allowable threshold of the exposure time for the digital zoom magnification value and a determination unit for determining whether the calculated exposure time is equal to or less than the obtained exposure time threshold. If it is determined that the calculated exposure time is equal to or less than the obtained exposure time threshold, the image shooting control unit takes in one piece of image data for ordinary image shooting. If it is determined that the calculated exposure time is more than the obtained exposure time threshold, the image shooting control unit takes in a plurality of pieces of image data for camera shake correction.

In this case, generally if the exposure time is short, the influence of a blur generated on the shot image due to camera shake is small. However, as the digital zoom magnification increases, the blur on the image due to camera shake also expands. If the digital zoom magnification changes in no such high range, a blur due to the overlapping of a plurality of images obtained by a plurality of times of image shooting does not expand remarkably within the range.

Therefore, if the digital zoom magnification changes in a range where a blur due to the overlapping of a plurality of images does not expand remarkably, the influence of the blur can be eliminated from the image by correcting camera shake as much as possible in accordance with an increase in the digital zoom magnification in the range where the blur due to the overlapping of the plurality of images does not expand remarkably, with obtaining an exposure time threshold corresponding to a specified digital zoom magnification value by the exposure time threshold acquisition unit on the basis of the zoom magnification/exposure time threshold storage unit corresponded by making the exposure time threshold for maintaining the quality of an image to be in inverse proportion to a digital zoom value, and with the determination unit determining whether the calculated exposure time is equal to or less than the obtained exposure time threshold. Thus, the expansion of a blur on an image by increasing digital zoom magnification and the deterioration of image quality due to no camera shake correction can be avoided.

The image shooting device with a camera shake correction function in the fifth aspect of the present invention is the image shooting device in the first aspect wherein the image shooting control unit outputs exposure control information to the image sensor according to an image shooting instruction, shoots both an ordinary image with no camera shake correction and consecutive images for camera shake correction, and takes in a plurality of pieces of image data. It further comprises a user interface unit for selecting and storing either or both of image data for ordinary image shooting and image data obtained by the correction unit, whose camera shake is corrected or both of them.

In this case, in one time of image shooting instruction, both image data for ordinary image shooting and image data whose camera shake is corrected are taken in. Then, either the image data for ordinary image shooting or the image data whose camera shake is corrected or both of them are selected and stored via the user interface unit. Thus, by selecting image data whose camera shake is less of them, image data with high quality, whose influence of camera shake is suppressed, can be obtained.

The image shooting device with a camera shake correction function in the sixth aspect of the present invention is the image shooting device in the first aspect wherein the image shooting control unit outputs exposure control information to the image sensor according to an image shooting instruction, shoots both an ordinary image with no camera shake correction and consecutive images for camera shake correction, and takes in a plurality of pieces of image data. It further comprises an edge extraction unit for extracting the respective edges of image data for ordinary image shooting and image data obtained by the correction unit, whose camera shake is corrected, each of which is the density change boundary in each image, and a storage unit for storing the image data, the resolution of whose extracted edge is higher.

In this case too, in one time of image shooting instruction, both image data for ordinary image shooting and image data whose camera shake is corrected are taken in. Then, of the two pieces of the image data for ordinary image shooting and the image data whose camera shake is corrected, image data, the resolution of whose extracted edge is higher is stored in the storage unit. Thus, image data with high quality, whose influence of camera shake is suppressed, can be obtained.

The image shooting device with a camera shake correction function in the seventh aspect of the present invention is the image shooting device in the first aspect wherein the image shooting control unit outputs exposure control information to the image sensor according to an image shooting instruction, shoots both an ordinary image with no camera shake correction and consecutive images for camera shake correction, and takes in a plurality of pieces of image data. It further comprises an S/N ratio calculation unit for calculating the respective S/N ratios of image data for ordinary image shooting and image data obtained by the correction unit, whose camera shake is corrected, each of which is a value obtained by dividing a necessary signal level by a noise level included in the signal and a storage unit for storing image data whose calculated S/N ratio is higher.

In this case too, in one time of image shooting instruction, both image data for ordinary image shooting and image data whose camera shake is corrected are taken in. Then, of the two pieces of the image data for ordinary image shooting and the image data whose camera shake is corrected, image data, whose S/N ratio, which is obtained by dividing a necessary signal level by a noise level included in the signal, is higher is stored by the S/N ratio calculation unit. Thus, image data with high quality, whose influence of camera shake is suppressed, can be obtained.

According to the present invention, in an area where image quality deteriorates (an area of high gain value), the quality of an image with a low S/N ratio (high gain value) can be more improved by using one piece of image data obtained for an exposure time obtained by adding the exposure time of each of a plurality of pieces of consecutive image data without applying any process to it than by suppressing the influence of camera shake by using an image data (whose camera shake is corrected) obtained from a plurality of pieces of image data obtained by consecutive image shooting.

According to the present invention, in a range where digital zoom magnification increases to more than some extent and a blur due to the overlapping of a plurality of images expands remarkably, the quality of a combined image obtained by overlapping respective images by consecutive image shooting can be avoided from remarkably deteriorating visually by avoiding camera shake correction.

According to the present invention, in a range where a blur due to the overlapping of a plurality of images does not expand remarkably, the influence of a blur can be eliminated from an image by correcting camera shake as much as possible as digital zoom magnification increases. Thus, the expansion of a blur by increasing digital zoom magnification can be avoided.

According to the present invention, image data with better quality, whose influence of camera shake is suppressed, can be obtained.

BRIEF DESCRIPTION OF THE DRAWINGS

FIG. 2B shows the operation in the case of the consecutive image shooting mode of the image shooting control unit shown in FIG. 1;

FIG. 4 conceptually shows the relationship between an S/N ratio and a gain value;

FIG. 5 is a flowchart showing an image shooting process performed by the image shooting device in the first preferred embodiment of the present invention;

FIG. 7 shows the data structure of the zoom magnification/exposure time threshold storage unit (No. 1);

FIG. 9 is a block diagram showing the configuration of the major part in the third preferred embodiment of the present invention;

FIG. 11 shows the data structure of the zoom magnification/exposure time threshold storage unit (No. 2);

FIG. 12 is a graph with digital zoom magnification and exposure time taken on horizontal and vertical axes, respectively, corresponding to the zoom magnification/exposure time threshold storage unit shown in FIG. 11;

FIGS. 13A and 13B explain the exposure function in the fourth, fifth and sixth preferred embodiments where consecutive three times of image shooting are implemented for camera shake correction;

FIG. 16 shows the operational procedure in the fourth preferred embodiment;

FIG. 18 shows the operational procedure in the fifth preferred embodiment;

FIG. 20 shows the operational procedure in the sixth preferred embodiment;

DESCRIPTION OF THE PREFERRED EMBODIMENTS

The preferred embodiments of the present invention are described in detail below with reference to the drawings.

Figure 1:
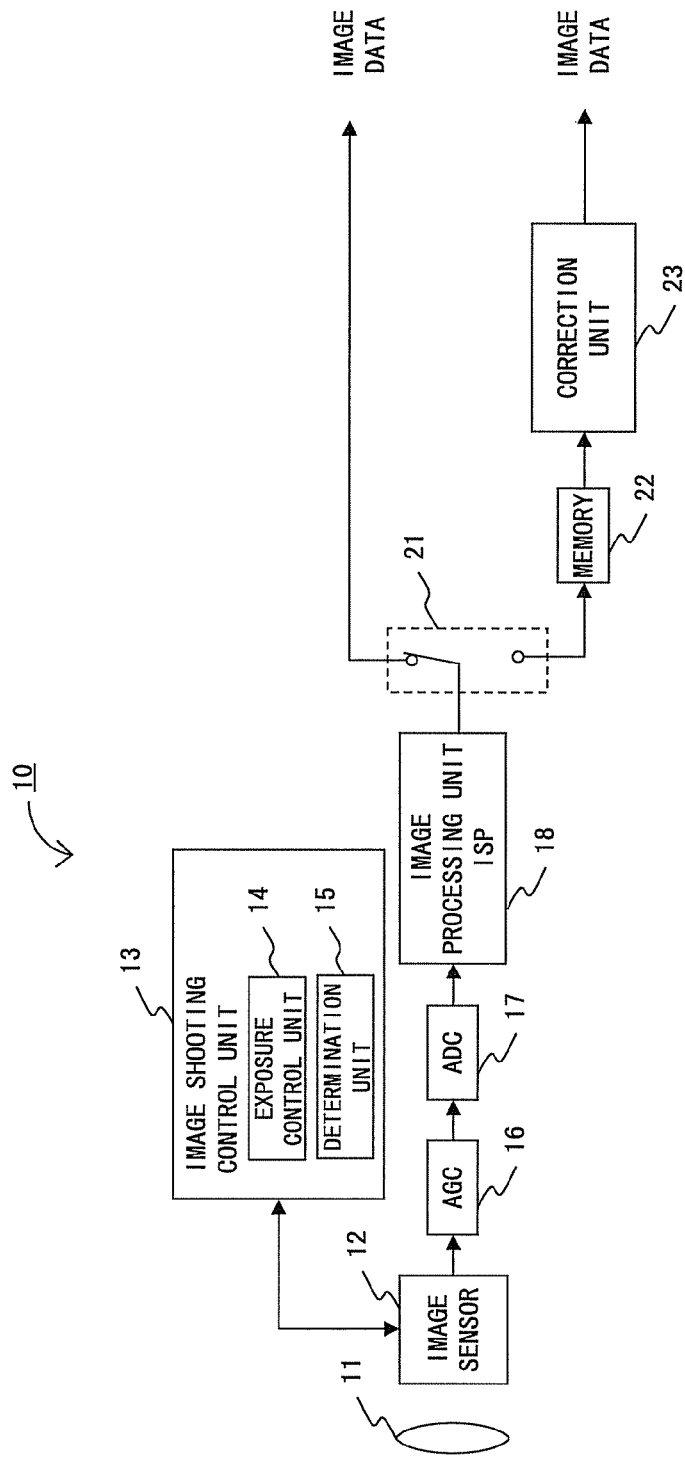
FIG. 1 is a block diagram showing the configuration of an image shooting device common to the first, second and third preferred embodiments of the present invention.

FIG. 1 is a block diagram showing the configuration of an image shooting device common to the first, second and third preferred embodiments of the present invention. Logic which the determination unit 15 uses for its determination differs in each of the first through third preferred embodiments.

In FIG. 1, an image shooting device 10 comprises a lens 11 for condensing light from a shooting target (object to be shot) on an image sensor 12, an image sensor 12 provided with light receiving unit for converting light received from the shooting target via the lens 11 into electric charge and storing it, which is not shown in FIG. 1 and a signal output unit for outputting the stored electric charge as photo-electrically converted data, which is not also shown in FIG. 1, an auto gain control (AGC) circuit 16 for controlling the gain of the photo-electrically converted data outputted from the image sensor 12, an analog/digital converter (ADC) 17 for converting the photo-electrically converted data whose gain is controlled from an analog value into a digital value, an image processing unit (also called an "image signal processor" (ISP)) 18 for generating image data on the basis of the output of the ADC 17, an exposure control unit 14 for calculating an exposure time, which is a time for storing the electric charge, and a gain value indicating how many times to amplify the photo-electrically converted data, of the shooting target, a determination unit 15 for determining whether the calculated gain value is equal to or more than a predetermined threshold and an image shooting control unit 13 for outputting a control signal including the calculated exposure control information (the exposure time and the gain value) to the image sensor 12 according to a image shooting instruction and taking in one or more pieces of image data via the image shooting process (processes by the light receiving unit and the signal output unit) by the image sensor 12.

If the determination unit 15 determines that the gain value calculated by the exposure control unit 14 is equal to or more than the threshold, the image shooting control unit 13 takes in one piece of image data via the image sensor (the light receiving unit and the signal output unit) 12. In this case, as shown in FIG. 1, a switch 21 is switched to the upper side based on a signal indicating a determination result from the determination unit 15, thereby the taken-in image data is outputted to memory for image data storage in the later stage, which is not shown in FIG. 1, without applying any process to it.

If the determination unit 15 determines that the gain value calculated by the exposure control unit 14 is less than the threshold, the image shooting control unit 13 takes in a plurality of pieces of image data via the image sensor (the light receiving unit and the signal output unit) 12. In this case, the (plurality of pieces of) taken image data is sequentially stored in memory 22 by switching the switch 21 to the side (lower side) that is the reversal of one shown in FIG. 1 based on the signal indicating the determination result from the determination unit 15. Then, a correction unit 23 generates one piece of image data whose camera shake is corrected, on the basis of the plurality of pieces of image data stored in the memory 22 and the generated image data (whose camera shake is corrected) is outputted to memory for image data storage in the later stage, which is not shown in FIG. 1.

In the case where the image shooting control unit 13, the exposure control unit 14, the determination unit 15, the image processing unit 18 and the correction unit 23 are realized as a program, the central processing unit (CPU) for implementing the image shooting control unit 13, the exposure control unit 14, the determination unit 15 and the image processing unit 18 and a CPU for implementing the correction unit 23 for camera shake correction can be either the same or separate.

The photo-electrically converted data outputted from the image sensor 12 is amplified by passing through the AGC circuit 16, is converted from an analog value to a digital value by passing through the ADC 17 and is inputted to the image processing unit 18.

The image processing unit 18, based on an input signal (also called "raw data") to it, performs a color separation process, a gamma correction process for linearly expressing luminance on a display, a white balance control process for expressing white color white regardless of the temperature of a light source and the like. Via the color separation process, the input signal is converted into a required form, such as a YUV signal, an RGB signal or the like.

The gain value G calculated by the exposure control unit 14 indicates how many times to amplify the photo-electrically converted data outputted from the image sensor 12. Specifically, if the photo-electrically converted data from the image sensor 12 is amplified by G1 times via the AGC circuit 16, a pixel component for a pixel is amplified by the required G times by the image processing unit 18 further amplifying data corresponding to the pixel in the image by G/G1 times.

In this case, the image processing unit 18 generates image data corresponding to the digital zoom magnification specified by a user via the user interface unit.

Figure 2A:
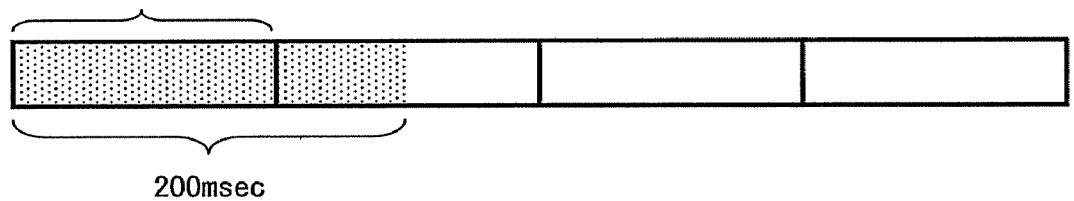
FIG. 2A shows the operation in the case of the single image shooting mode of the image shooting control unit shown in FIG. 1.

FIG. 2A and FIG. 2B show the operations in the case of the single and consecutive image shooting modes, respectively, of the image shooting control unit 13.

In the case of a single image shooting mode, the image shooting control unit 13 takes in image data once. In FIG. 2A, exposure (the storage of electric charge) is started in synchronization with a vertical synchronizing signal (VSYNC signal) transmitted every 133 msec. FIG. 2A shows a case where the exposure control unit 14 sets 200 msec as exposure time.

In the case of a consecutive image shooting mode, the image shooting control unit 13 takes in image data a plurality of times (times n; n=2 or more integer). FIG. 2B shows a case where n=3. In FIG. 2B too, exposure (the storage of electric charge) is started in synchronization with a vertical synchronizing signal (VSYNC signal) transmitted every 133 msec.

FIG. 2B shows a case where the exposure control unit 14 sets 200 msec as exposure time. In this case, a value (66 msec) obtained by dividing the exposure time (200 msec) by image data taking times (three times) is calculated as the exposure time of each piece of image data. In the case of the consecutive image shooting, the correction unit 23 performs camera shake correction on the basis of a plurality of pieces of image data obtained by the consecutive image shooting and one piece of image data whose camera shake is corrected is obtained. Generally, if the number of images by consecutive image shooting and the exposure time calculated by the exposure control unit 14 are N and E, respectively, when performing such consecutive image shooting for camera shake correction, the exposure time of each piece of image data is given by E/N.

Sometimes the same gain value is used in the both cases of single and consecutive image shooting and sometimes the gain value in the case of consecutive image shooting is set to n times (n=number of consecutive image shooting) as much as that in single image shooting.

The exposure starting timing can also be determined using a signal other than the VSYNC signal.

As described above, a plurality of pieces of image data obtained by consecutive image shooting is stored in the memory 22 shown in FIG. 1, and then the correction unit 23 generates one piece of image data whose camera shake is corrected, on the basis of the plurality of pieces of image data stored in the memory 22.

Figure 3:
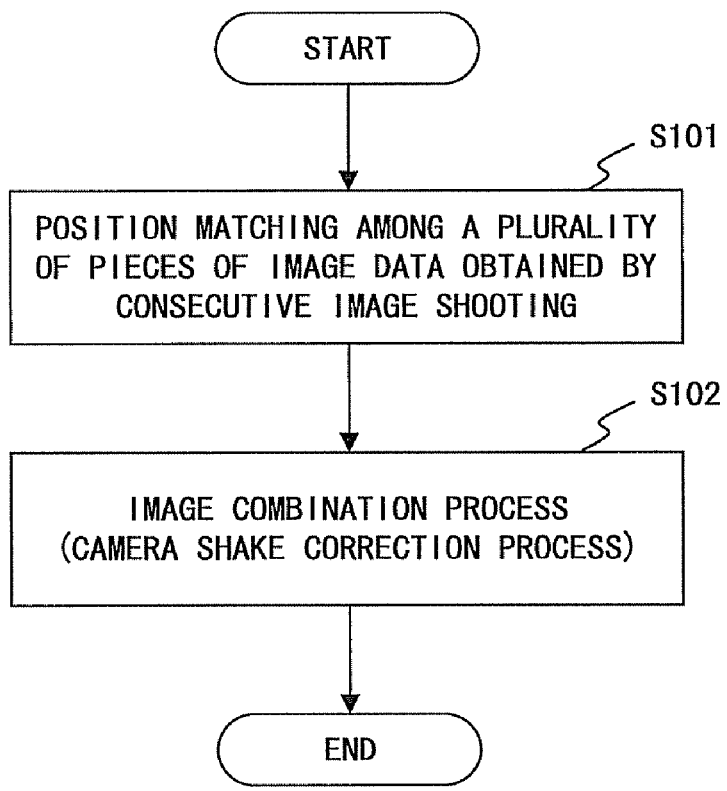
FIG. 3 is a flowchart showing the summary of a camera shake correction process performed by the correction unit shown in FIG. 1.

FIG. 3 is a flowchart showing the summary of a camera shake correction process performed by the correction unit 23.

In FIG. 3, firstly in step S101, the positions of a plurality of pieces of image data obtained from the memory 22 are matched among them. In this position matching, the amount of deviation among the plurality of pieces of image data is calculated. For example, in the case where three pieces of image data is obtained, it is calculated that corresponding pixels can be overlapped each other by how much sliding the first image data of three pieces of image data against the second image data (reference image data) and by how much sliding the third image data against the second image data.

Then, in step S102, camera shake correction process (image combination process) is performed by combining the plurality of pieces of image data on the basis of the result of the position matching. In this image combination process, for example, as to pixels which correspond in all the pieces of image data, the values of the pixels are overlapped and reflected in the pixel in the combined image data. As to a pixel which exists only in either piece of image data, the value of the pixel is multiplied by the number to be overlapped and is reflected in the pixel in the combined image data.

Then, inconvenience caused when the gain value calculated by the exposure control unit 14 is large and also when a plurality of pieces of image data obtained by consecutive image shooting are overlapped is described.

When combining N pieces of image data, each pixel of the N pieces of image data has noise at random. Therefore, for example, when adding corresponding pixels in all images, the signal level increases to N times of that of each piece of image data. However, the average noise level increases only to $N^{1/2}$ times of that of each piece of image data.

As described above, if the exposure time of each piece of image data is determined by multiplying the exposure time E calculated by the exposure control unit 14 by 1/N when taking in N pieces of image data by consecutive image shooting, an S/N ratio indicating the noise of each image becomes a value proportional to the exposure time in each piece of image data, specifically a value 1/N times as much as the S/N ratio of the image data obtained for the exposure time E. Since as described above, noise is put on each pixel of the image data at random, in the combined image data, it becomes $N^{1/2}/N$ times as much as the S/N ratio of the image data obtained for the exposure time E. Since N is a 2 or more integer, this value ($N^{1/2}/N$) is smaller than 1. Specifically, if the exposure time obtained by adding the exposure time of the image data of each of a plurality times of image shooting is equal to the exposure time in one time of image shooting, for example, the S/N ratio of the image data obtained by combining a plurality of pieces of image data by the plurality times of image shooting (consecutive image shooting) is smaller than the S/N ratio of one piece of image data obtained by the one time of image shooting.

However, since the amount of camera shake is in proportion to exposure time, the influence of camera shake is small even when the S/N ratio of the image combined using a plurality of images for consecutive image shooting deteriorates more. Therefore, it sometimes looks as if its image quality were improved for human eyes.

In this case, the S/N ratio indicates the ratio between a signal and noise and is an index used to evaluate its sound and image quality. Specifically, the S/N ratio is obtained by dividing a necessary signal level by the level of noise included in the signal. Its unit is dB (decibel). The higher the value is, generally the less noise is (high quality). Since the amplitude of noise is indefinite, the magnitude of noise is expressed by standard deviation and a method of measuring an S/N ratio by the expression "average signal level/noise standard deviation" is usually used as its simple measuring method.

FIG. 4 conceptually shows the relationship between an S/N ratio and a gain value.

When a gain value increase, noise included in an image increases. Therefore, in that case, the S/N ratio decreases and image quality deteriorates. Specifically, an S/N ratio is in inverse proportion to a gain value. In FIG. 4, attention must be paid to the fact that the arrow mark of the S/N ratio on the vertical axis is directed from a higher value toward a lower value.

In FIG. 4, straight lines (1) and (2) indicate the relationship between the gain value and S/N ratio of the image data combined using a plurality of pieces of image data for consecutive image shooting and that between the gain value and S/N ratio of one piece of image data obtained for the exposure time obtained by adding the exposure time of each piece of image data by consecutive image shooting, respectively. A straight line (3) parallel with the horizontal axis (gain value) indicates an S/N ratio corresponding to the allowable limit of image quality in the case where viewed by human eyes.

For example, although in a high S/N ratio area, as shown by an arrow mark A in FIG. 4, the deterioration of image quality due to using an image obtained from a plurality of pieces of image data by consecutive image shooting cannot be almost visually recognized, in a low S/N ratio area, as shown by an arrow mark B, it cannot be neglected.

As a result, in the area marked by the arrow mark B (in an area whose image quality deteriorates, in an area whose gain value is high), an image with visually better quality can be obtained from one piece of image data (the solid line part of the straight line (2)) obtained for the exposure time obtained by adding the exposure time of each piece of image data by consecutive image shooting without applying any process than by using the image data whose camera shake is corrected (the solid line part of the straight line (1)) obtained from a plurality of images by consecutive image shooting to suppress the influence of camera shake in the image data whose camera shake is corrected.

Specifically, the quality of an image with a low S/N ratio (and a high gain value) can be improved by specifying a gain value in the neighborhood where the S/N ratio of the image (straight line (1)) combined using the plurality of images for consecutive image shooting becomes equal to or less than the image quality allowable limit (straight line (3)) and deteriorates as its threshold and the determination unit 15 determining whether to shoot consecutively (in other words, correct camera shake) on the basis of whether the calculated gain value is equal to or more than the threshold.

FIG. 5 is a flowchart showing an image shooting process performed by the image shooting device in this preferred embodiment. A series of processes is started using the pushing of a shutter button (image shooting button) by the user of the image shooting device as a trigger.

In FIG. 5, firstly in step S201, the exposure control unit 14 calculates exposure control information (an exposure time and a gain value) on the basis of measured luminance information in the first prescribed time after a shutter is opened. Then, in step S202, the determination unit 15 determines whether the calculated gain value is equal to or more than its threshold.

If it is determined, in step S202, that the calculated gain value is smaller than the threshold, in step S203, the image sensor 12 performs its image shooting process on the basis of a control signal from the image shooting control unit 13.

In this preferred embodiment, for example, although the number N of times of consecutive image shooting is determined on the basis of a table in which the number N of times of consecutive image shooting is corresponded for each exposure time calculated by the exposure control unit 14, it can also be determined by another method.

The image shooting control unit 13 calculates the exposure time (E/N) of one time of image shooting in consecutive image shooting by dividing the calculated exposure time E by the number N of times of consecutive image shooting.

As to the gain value, there are two cases; a case where the image shooting control unit 13 also uses the gain value calculated by the exposure control unit 14 in the case of consecutive image shooting without applying any process, and a case where in the case of consecutive image shooting a value obtained by multiplying the gain value calculated by the exposure control unit 14 by the number N of image shooting is used. In the case of using the gain value calculated by the exposure control unit 14 without applying any process, the image processing unit 18 overlaps the corresponding pixels of a plurality of images without applying any process when the camera shake correction is performed. However, in the case of multiplying the gain value by N, the corresponding pixels of the plurality of images are overlapped and then the overlapped value of the pixel is divided by the number N of image shooting when the camera shake correction is performed.

Then, in step S204, as a result of the image shooting process in step S203, photo-electrically converted data is inputted to the image processing unit 18 from the image sensor 12 and the image processing unit 18 performs an image data generation process.

In step S205, the image data generated in step S204 is stored in the memory 22. In step S206, it is determined whether the image shooting finishes. If the image shooting does not finish, the process returns to step S203. If the image shooting finishes, the series of processes are terminated.

If it is determined, in step S202, that the calculated gain value is equal to or more than the threshold, in step S207, the image sensor 12 performs an image shooting process on the basis of a control signal from the image shooting control unit 13. In this case, one time of image shooting is executed and no camera shake is corrected. The image shooting control unit 13 instructs the image sensor 12 to execute one time of image shooting using the calculated exposure time and gain value without applying any process in the control signal.

Then, in step S208, as a result of the image shooting process in step S207, the image sensor 12 inputs the photo-electrically converted data to the image processing unit 18. Then, the image processing unit 18 performs an image data generation process and also outputs the generated image data to the later stage.

Next, the second preferred embodiment of the present invention is described. Although in the first preferred embodiment, whether to implement consecutive image shooting (to correct camera shake) is determined on the basis of whether the gain value is equal to or more than its threshold, in the second preferred embodiment, it is determined whether digital zoom magnification set by a user via the user interface unit is equal to or more than its threshold and it is determined whether to implement consecutive image shooting (to correct camera shake) according to the former determination result.

Figure 6:
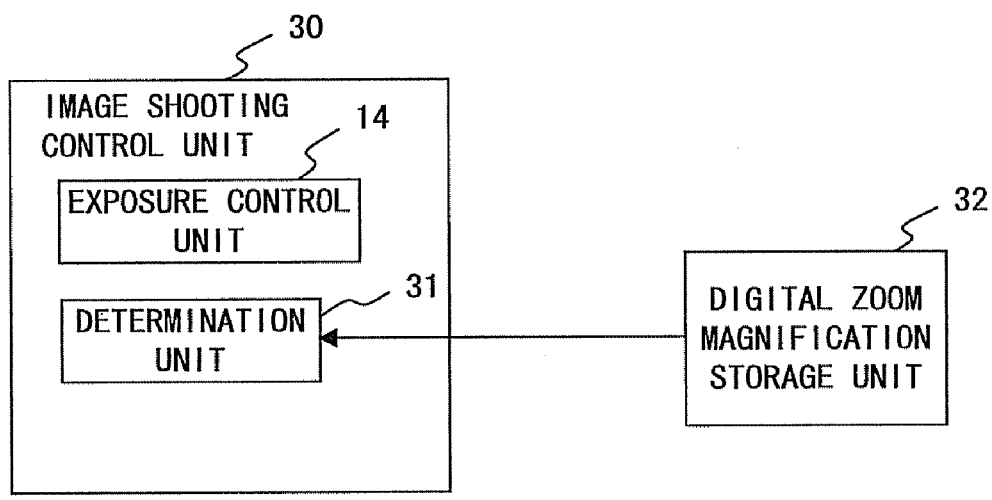
FIG. 6 is a block diagram showing the configuration of the major part in the second preferred embodiment of the present invention.

FIG. 6 is a block diagram showing the configuration of the major part in the second preferred embodiment of the present invention.

In FIG. 6, digital zoom magnification which a user sets via the user interface unit is stored in a digital zoom magnification storage unit 32.

When determining whether to correct camera shake, the determination unit 31 of the image shooting control unit 30 obtains digital zoom magnification from the digital zoom magnification storage unit 32 and determines whether the obtained digital zoom magnification value is equal to or more than a threshold.

In this case, if the digital zoom magnification increases to more than some extent, the extraction accuracy of feature points used for position matching in the image remarkably deteriorates due to the enlargement process of the image according to the magnification. Then, when overlapping (combining) each image obtained by consecutive image shooting, a blur due to the overlapping is expanded by this and the quality of the combined image remarkably deteriorates (visually). After detecting edges (outlines), which are the boundaries of density change in an image, the above-described feature points can be obtained by extracting only parts whose features can be discriminated easily, such as a high-intensity point, an end-point, a vertex, a branching point and an intersection, from the edges.

In this second preferred embodiment, a threshold is set in the digital zoom magnification. Then, if a set digital zoom magnification value is equal to or more than the threshold, consecutive image shooting (camera shake correction) is not implemented. If the set digital zoom magnification value falls below the threshold, consecutive image shooting (camera shake correction) is implemented. Thus, if the digital zoom magnification increases to more than some extent, the quality of a combined image obtained by overlapping each image obtained by consecutive image shooting can be avoided from remarkably deteriorating (visually).

Next, the third preferred embodiment of the present invention is described.

Figure 8:
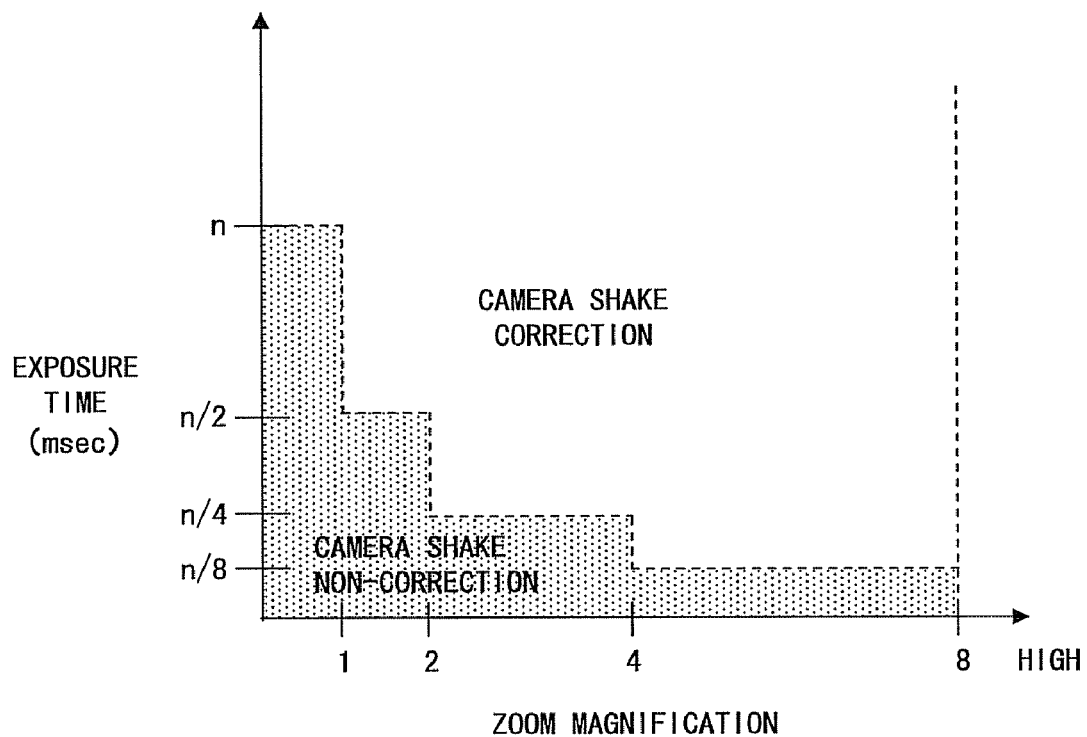
FIG. 8 is a graph with digital zoom magnification and exposure time taken on horizontal and vertical axes, respectively, corresponding to the zoom magnification/exposure time threshold storage unit shown in FIG. 7.

Generally, when an exposure time is short, the influence of a blur caused on a shot image by camera shake is small. However, when digital zoom magnification increases, the blur on the image due to camera shake is also enlarged. If digital zoom magnification changes in no such high range, a blur due to the overlapping of a plurality of images obtained by consecutive image shooting as in the second preferred embodiment does not expand remarkably within the range, different from the second preferred embodiment. Within the range, it is preferable to eliminate the influence of the blur on the image by correcting camera shake as more as possible as the digital zoom magnification increases. In order to realize this, as shown in FIG. 7, a table (zoom magnification/exposure time threshold storage unit) in which an exposure time threshold (th) for (visually) maintaining the quality of an image better than or at a certain level is corresponded in inverse proportion to (the range of) a digital zoom value can be provided for a case where the digital zoom magnification changes in no such high range (0-8 in FIG. 7). FIG. 8 is a graph with digital zoom magnification and exposure time taken on horizontal and vertical axes, respectively, corresponding to the zoom magnification/exposure time threshold storage unit shown in FIG. 7.

In FIGS. 7 and 8, the upper limit of the digital zoom magnification is set to eight times. In FIGS. 7 and 8, data is collected from an image shooting device in which the range (0-8) of digital zoom value is set as a range in which the blur due to the overlapping of a plurality of images obtained by consecutive image shooting does not expand remarkably.

Specifically, in this third preferred embodiment, as shown in FIG. 9, the determination unit 41 obtains an exposure time threshold corresponding to a specified digital zoom magnification value on the basis of the zoom magnification/exposure time threshold storage unit 42 in which an exposure time threshold is corresponded in inverse proportion to (the range of) a digital zoom magnification value, and determines whether an exposure time calculated by the exposure control unit 14 is equal to or less than the obtained exposure time threshold. Then, according to the determination result, the determination unit 41 determines whether to implement consecutive image shooting (camera shake correction).

Figure 10:
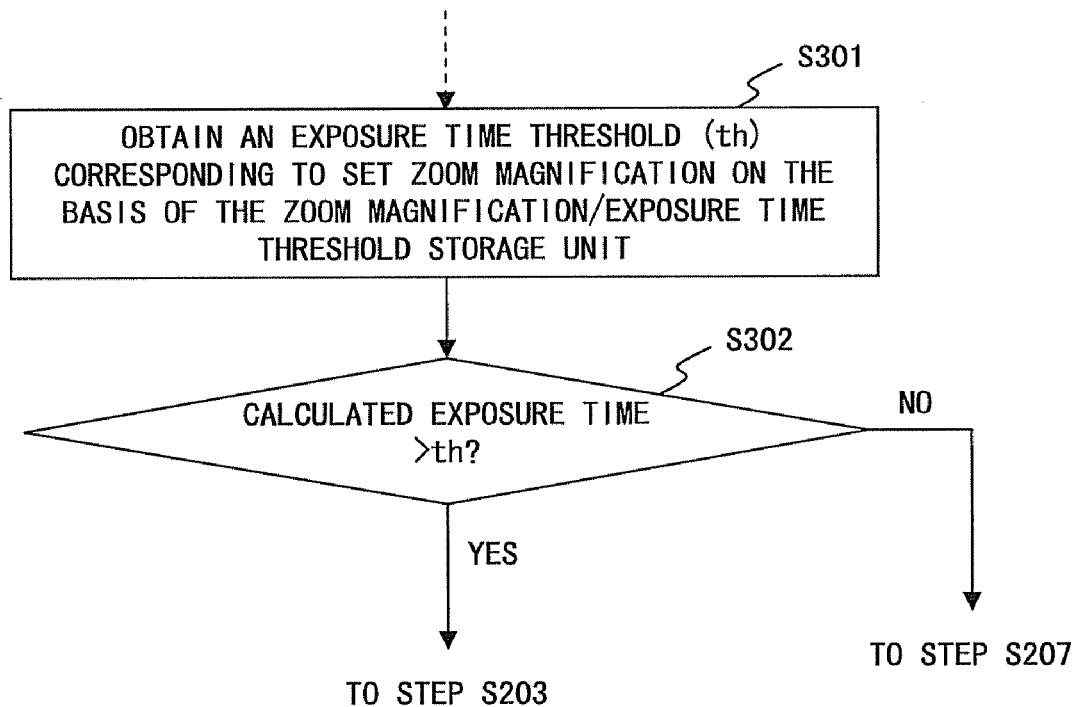
FIG. 10 is a flowchart showing the determination process in the third preferred embodiment of the present invention.

FIG. 10 is a flowchart showing the determination process in the third preferred embodiment of the present invention. The flowchart of the image shooting process in the third preferred embodiment can be obtained by replacing step S202 shown in FIG. 5 with each step shown in FIG. 10.

In FIG. 10, firstly in step S301, the determination unit 41 obtains an exposure time threshold corresponding to a set digital zoom magnification value (value stored in a digital zoom magnification storage unit 32) on the basis of the zoom magnification/exposure time threshold storage unit 42. Then, in step S302, the determination unit 41 determines whether the exposure time calculated by the exposure control unit 14 is equal to or less than the obtained exposure time threshold.

If in step S302 it is determined that the calculated exposure time is equal to or less than the obtained exposure time threshold, the process proceeds to step S207 shown in FIG. 5. If in step S302 it is determined that the calculated exposure time is more than the obtained exposure time threshold, the process proceeds to step S203 shown in FIG. 5.

As described above, in this third preferred embodiment, if digital zoom magnification changes in no such high range and therefore a blur due to the overlapping of images at the time of camera shake correction does not expand remarkably, camera shake is corrected as more as possible as the digital zoom magnification increases and the influence of the blur is eliminated from the image. Thus, expanding of the blur on the image due to an increase in the zoom magnification can be avoided.

The configurations of the second and third preferred embodiments can also be combined.

In this case, as shown in FIG. 11, a table (zoom magnification/exposure time threshold storage unit) in which if digital zoom magnification changes in no such high range (0-6 in FIG. 11), an exposure time threshold (th) is corresponded in inverse proportion to (the range of) a digital zoom value and if digital zoom magnification changes in a fairly high range (6-8 in FIG. 11), an exposure time threshold which requires no camera shake correction (for example, the maximum exposure time m) is corresponded to (the range of) a digital zoom value can be provided (since the blur due to the overlapping of images at the time of camera shake correction expands remarkably in this fairly high range, the above-described exposure time threshold is specified to require no overlapping). FIG. 12 is a graph with digital zoom magnification and exposure time taken on horizontal and vertical axes, respectively, corresponding to the zoom magnification/exposure time threshold storage unit shown in FIG. 11.

In FIGS. 11 and 12, the upper limit of digital zoom magnification is set to eight times. In FIGS. 11 and 12, data is collected from a image shooting device in which the range (0-6) of a digital zoom magnification value is set as a range in which the blur due to the overlapping of a plurality of images obtained by consecutive image shooting does not expand remarkably, and the range (6-8) of a digital zoom value is set as a range in which the blur due to the overlapping of a plurality of images obtained by consecutive image shooting expands remarkably.

Next, the fourth, fifth and sixth preferred embodiments are described.

In these preferred embodiments, both single image shooting in which no camera shake is corrected and consecutive image shooting in which camera shake is corrected are implemented and a plurality of pieces of image data are taken in (there is no order between single image shooting and consecutive image shooting).

FIGS. 13A and 13B explain the exposure function in the fourth, fifth and sixth preferred embodiments where three times of consecutive image shooting are implemented for camera shake correction.

In FIG. 13A, at one time of image shooting, three times of exposure for consecutive image shooting in which camera shake is corrected are implement following one time of ordinary exposure in which no camera shake is corrected. In FIG. 13B, at one time of image shooting, one time of ordinary exposure in which no camera shake is corrected is implemented following three times of exposure for consecutive image shooting in which camera shake is corrected.

Figure 14:
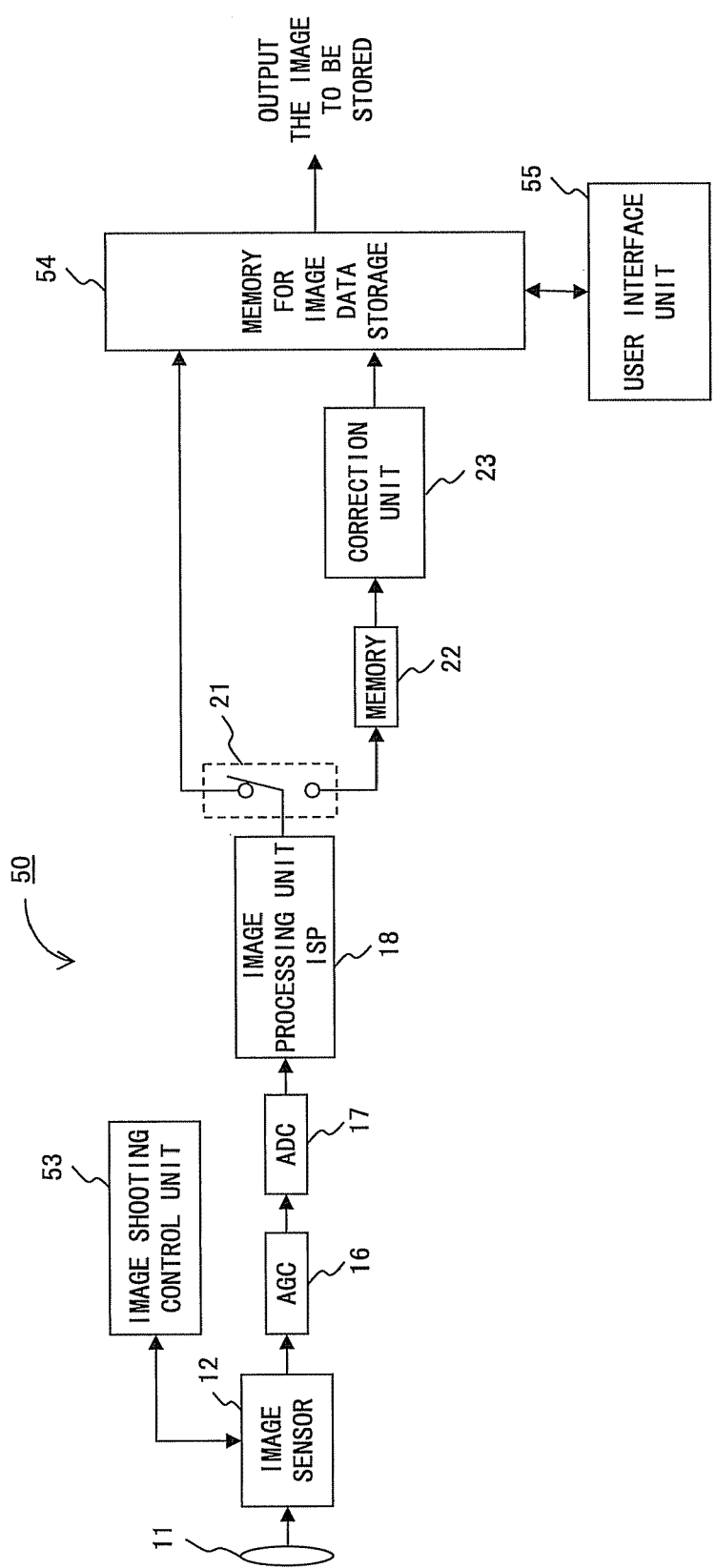
FIG. 14 is a block diagram showing the configuration of an image shooting device common to the fourth, fifth and sixth preferred embodiments of the present invention.

FIG. 14 is a block diagram showing the configuration of an image shooting device common to the fourth, fifth and sixth preferred embodiments of the present invention.

In FIG. 14, since the lens 11, image sensor 12, AGC 16, ADC 17, image processing unit 18, memory 22 and correction unit 23 of an image shooting device 50 are the same as those of the image shooting device 10 shown in FIG. 1, their descriptions are omitted here.

In the image shooting device 50, a image shooting control unit 53 outputs a control signal including exposure control information calculated for a shooting target to the image sensor 12, according to a image shooting instruction and takes in a plurality of pieces of image data via the image shooting process of the image sensor 12 (the process performed by the above-described light receiving unit and signal output), instead of performing the determination process in the first through third preferred embodiments.

A switch 21 is, for example, switched to the lower side in a timing when ordinary exposure changes to consecutive image shooting exposure in FIG. 13A and switched to the upper side in a timing when consecutive image shooting exposure changes to ordinary exposure in FIG. 13B.

One piece of image data taken in by ordinary exposure and one piece of image data obtained from a plurality of pieces of image data taken in by consecutive image shooting exposure, whose camera shake is corrected are both stored in memory 54 for image data storage.

A user interface unit 55 is described in each preferred embodiment.

Figure 15:
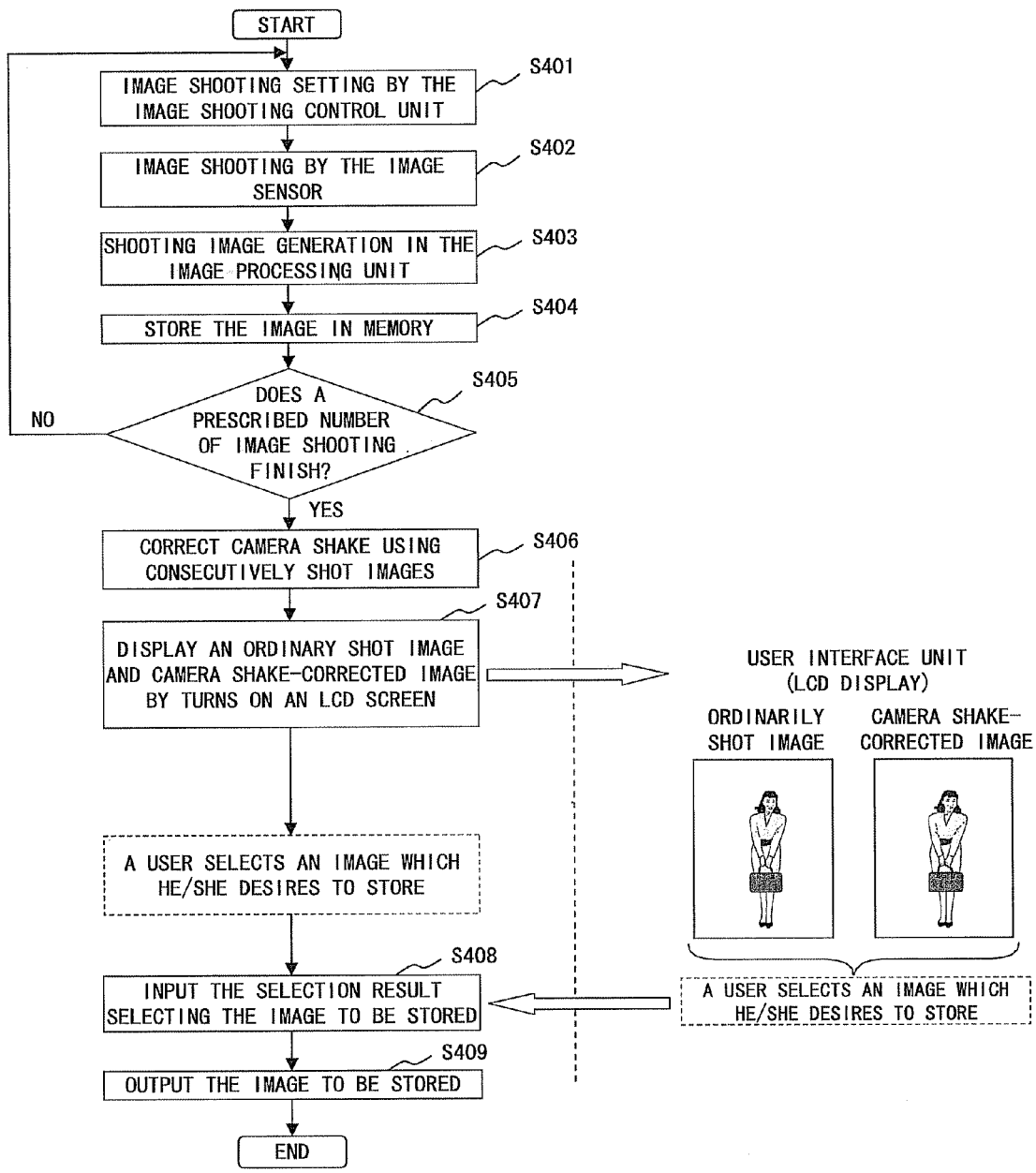
FIG. 15 is a flowchart covering up to the storage process of a taken image from the image shooting process in the fourth preferred embodiment.

FIG. 15 is a flowchart covering up to the storage process of a taken image from the image shooting process in the fourth preferred embodiment. This flowchart is executed by each unit shown in FIG. 14.

Firstly in step S401, the image shooting control unit 53 sets settings for single and consecutive image shooting (there is no order between single image shooting and consecutive image shooting). According to a image shooting instruction, the image shooting control unit 53 outputs a control signal including exposure control information calculated for a shooting target to the image sensor 12.

Then, in step S402, a plurality of pieces of image data is taken in via the image shooting process of the image sensor 12. Specifically, the image sensor 12 converts light received from the shooting target via the lens 11 into electric charge and stores it. Then, the stored electric charge is outputted to the image processing unit 18 as photo-electrically converted data.

In step S403, the image processing unit 18 generates (shot) image data. Specifically, the image processing unit 18 performs a color separation process, a gamma correction process for linearly expressing luminance on a display, a white-balance control process for expressing a white color white regardless of the temperature of a light source and the like, on the basis of the photo-electrically converted data (also called an "input signal" or "raw data"). The input signal is converted into a required form, such as a YUV signal, an RGB signal or the like via the color separation process.

Then, in step S404, the image data generated by the image processing unit 18 is stored in the memory 54 for image data storage or the memory 22. Specifically, image data taken in by ordinary exposure is stored in the memory 54 for image data storage and image data taken in by exposure for consecutive image shooting is stored in the memory 22.

The number of times of exposure for consecutive image shooting is, for example, predetermined for each image shooting device. Then, in step S405, it is determined whether image shooting with the number of times of consecutive exposure for consecutive image shooting plus one time (corresponding to ordinary exposure) (four times of exposure in total in FIGS. 13A and 13B) is implemented.

If in step S405 it is determined that image shooting with the predetermined number of times plus one time is not implemented, the process returns to step S401.

If in step S405 it is determined that image shooting with the predetermined number of times plus one time is implemented, in step S406 a camera shake correction process is performed on the basis of a plurality of pieces of image data taken in by exposure for consecutive image shooting, for example, as shown in FIG. 3 and one piece of image data is obtained. Then, the image data is stored in the memory 54 for image data storage.

In step S407, two pieces of image data stored in the memory 54 for image data storage (ordinarily shot image data and camera shake-corrected image data) are displayed by turns on an image display unit, which is not shown in FIG. 14, according to a switching instruction issued by a user via the user interface unit 55.

The user checks the image data displayed by turns on the image display unit and stores his/her desired image data by issuing a determination instruction to the desired image data via the user interface unit 55.

In step S408 the user interface unit 55 inputs this determination instruction as a selection result, and in step S409 it outputs the selected image data as image data to be stored, for example, to memory in the far later stage, which is not shown in FIG. 14.

FIG. 16 shows the operational procedure in the fourth preferred embodiment.

As shown in FIG. 16, for example, in a cellular phone, firstly a shooting target is displayed on its display by pushing a camera button, which is not shown in FIG. 14 (the display is used as a camera finder).

Then, by pushing a shutter button, the camera finder display is cancelled and a target shot at that time point is taken as image data.

By pushing a "⇒" button, as shown in step S407, image data displayed on the image display unit is switched to subsequent one.

By pushing a determination button, image data displayed on the image display unit is stored.

As described above, in this fourth preferred embodiment, either ordinarily shot image data or camera shake-corrected image data or both of them are selected and stored via the user interface unit 55. Thus, for example, by selecting image data whose camera shake is small, image data with better quality, whose influence of camera shake is suppressed, can be obtained.

Figure 17:
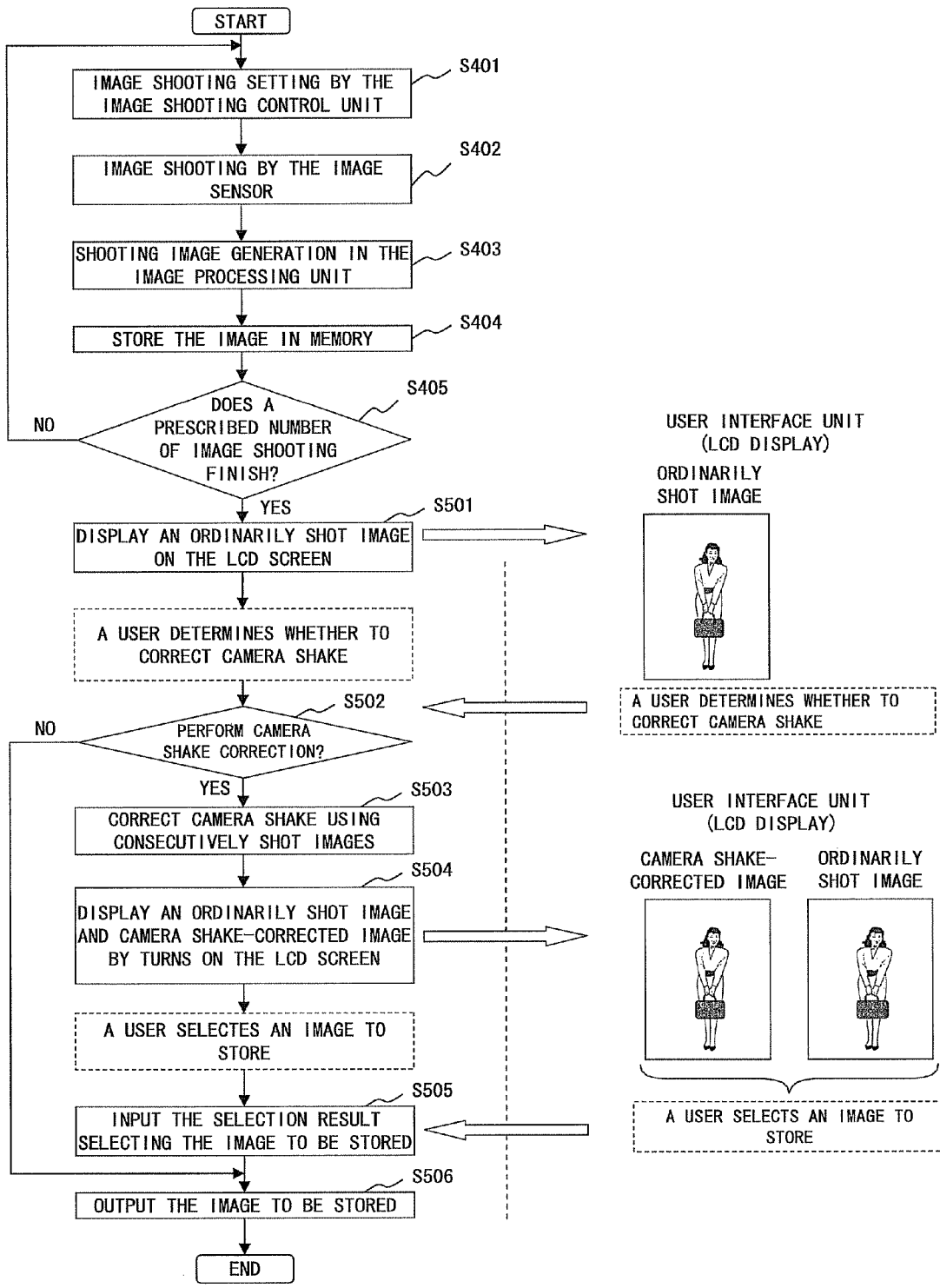
FIG. 17 is a flowchart covering up to the storage process of a taken image from the image shooting process in the fifth preferred embodiment.

FIG. 17 is a flowchart covering up to the storage process of a taken image from the image shooting process in the fifth preferred embodiment. This flowchart is executed by each unit shown in FIG. 14.

Since steps S401 through S405 are the same as those shown in FIG. 15, their descriptions are omitted here.

(If in step S405 it is determined that a predetermined number of times plus one time of image shooting is implemented,) in step S501 image data taken in by ordinary exposure, which is stored in the memory 54 for image data storage, is displayed on the image display unit, which is not shown in FIG. 14.

A user checks the image data taken in by ordinary exposure which is displayed on the image display unit and determines whether to store it. For example, if the user desires to store the image data, the user stores the image data by issuing a determination instruction via the user interface unit 55.

If the user pushes a "↓" button via the user interface unit 55, it is determined that camera shake should be corrected, and if a "clear" button is pushed, it is determined that no camera shake should be corrected.

The user interface unit 55 determines whether to correct camera shake in step S502 on the basis of the type of a pushed button.

If the user interface unit 55 determines that no camera shake should be corrected, the process proceeds to step S506.

If the user interface unit 55 determines that camera shake should be corrected, in step S503, for example, as shown in FIG. 3, camera shake correction is performed on the basis of a plurality of pieces of image data taken in by exposure for consecutive image shooting and one piece of image data is obtained. Then, the image data is stored in the memory 54 for image data storage.

In step S504, two pieces of image data stored in the memory 54 for image data storage (ordinarily shot image data and camera shake-corrected image data) are displayed by turns on an image display unit, which is not shown in FIG. 14, according to a switching instruction issued by a user via the user interface unit 55.

The user checks the image data displayed by turns on the image display unit and stores his/her desired image data by issuing a determination instruction to the desired image data via the user interface unit 55.

In step S505, the user interface unit 55 inputs this determination instruction as a selection result and the process proceeds to step S506.

In step S506, the user interface unit 55 outputs the image data selected in step S505 or ordinarily shot image data, for example, to memory in the far later stage, which is not shown in FIG. 14, as image data to be stored.

FIG. 18 shows the operational procedure in the fifth preferred embodiment.

As shown in FIG. 18, for example, in a cellular phone, firstly a shooting target is displayed on its display by pushing a camera button, which is not shown in FIG. 14 (the display is used as a camera finder).

Then, by pushing the shutter button, the camera finder display is cancelled and a target shot at that time point is taken as image data.

If only one piece of ordinarily shot image can be displayed on the image display unit, by pushing the determination button the image data displayed on the image display unit is stored and by pushing the "↓" button, camera shake is corrected. By pushing the "clear" button, no camera shake correction is determined.

If two images of an ordinarily shot image and a camera shake-corrected image can be displayed on the image display unit, by pushing the determination button the image data displayed on the image display unit is stored and by pushing the "⇒" button, as shown in step S504, image data displayed on the image display unit is switched to subsequent one.

Figure 19:
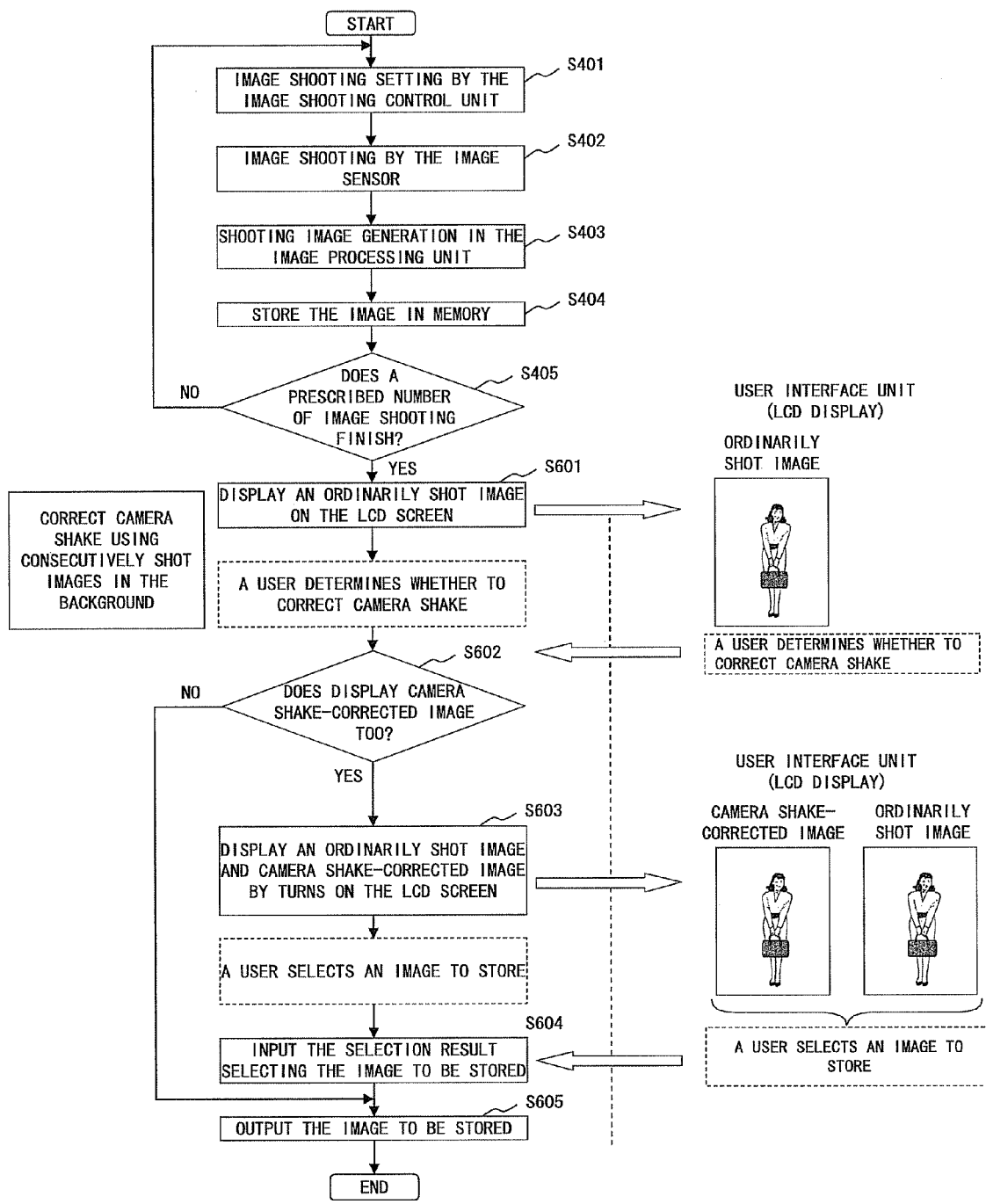
FIG. 19 is a flowchart covering up to the storage process of a taken image from the image shooting process in the sixth preferred embodiment.

FIG. 19 is a flowchart covering up to the storage process of a taken image from the image shooting process in the sixth preferred embodiment. This flowchart is executed by each unit shown in FIG. 14.

Since steps S401 through S405 are the same as those shown in FIG. 15, their descriptions are omitted here.

(If in step S405 it is determined that a predetermined number of times plus one time of image shooting is implemented,) in step S601 image data taken in by ordinary exposure, which is stored in the memory 54 for image data storage, is displayed on the image display unit, which is not shown in FIG. 14.

A user checks the image data taken in by ordinary exposure which is displayed on the image display unit and determines whether to store it. For example, if the user desires to store the image data, the user stores the image data by issuing a determination instruction via the user interface unit 55.

If the user desires the camera shake-corrected image data too on the image display unit, the user pushes the "↓" button via the user interface unit 55. Although in the fifth preferred embodiment, camera shake is corrected using the pushing of this "↓" button as a trigger, in the sixth preferred embodiment, camera shake correction is performed in parallel with the display of ordinarily shot image on the image display unit in step S601.

In step S602, the user interface unit 55 determines the pushing of the "↓" button as an operation for the display of camera shake-corrected image data on the image display unit. By this, the ordinarily shot image and the camera shake-corrected image enters into a state where these two images can be displayed on the image display unit by turns according to a switching instruction (for example, by pushing the "⇒" button) issued by the user via the user interface unit 55 in step S603.

If in this state, the user checks the image data displayed by turns on the image display unit and issues a determination instruction to store desired image data via the user interface unit 55, the image data is stored.

In step S604, the user interface unit 55 inputs this determination instruction as a selection result, and in step S605 it outputs the selected image data, for example, the memory in the far later stage, which is not shown in FIG. 14, as image data to be stored.

FIG. 20 shows the operational procedure in the sixth preferred embodiment.

As shown in FIG. 20, for example, in a cellular phone, firstly a shooting target is displayed on its display by pushing a camera button, which is not shown in FIG. 14 (the display is used as a camera finder).

Then, by pushing the shutter button, the camera finder display is cancelled and a target shot at that time point is taken as image data.

If only one piece of ordinary shot image can be displayed on the image display unit, by pushing the determination button, image data displayed on the image display unit is stored and by pushing the "↓" button, ordinarily shot image and camera shake-corrected image enters into a state where these two images can be displayed on the image display unit, specifically a state where camera shake-corrected image data is also picked up as a candidate for image data to be stored in addition to ordinarily shot image data.

In the state where two of ordinarily shot image and camera shake-corrected image can be displayed on the image display unit, by pushing the determination button, image data displayed on the image display unit is stored, and by pushing the "⇒" button, as shown in step S603, image data displayed on the image display unit is switched to subsequent one.

Next, the seventh and eighth preferred embodiments are described.

In these preferred embodiments, as in the forth through sixth preferred embodiments, single image shooting in which no camera shake is corrected and consecutive image shooting in which camera shake is corrected are both implemented and a plurality of pieces of image data are taken in (there is no order between single image shooting and consecutive image shooting).

The seventh preferred embodiment comprises a feature point extraction unit 56 instead of the user interface unit 55. The eighth preferred embodiment comprises an S/N ratio calculation unit 57 instead of the user interface unit 55.

Figure 21:
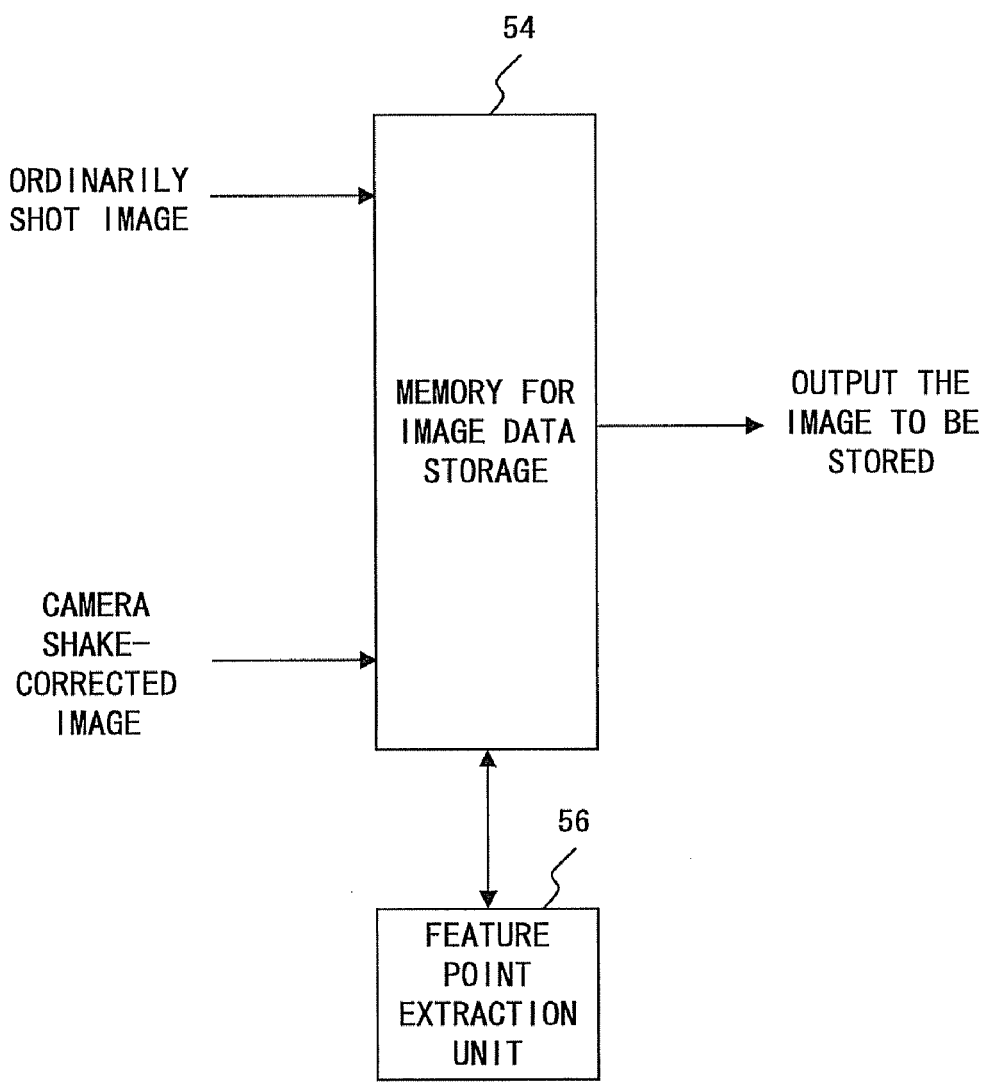
FIG. 21 is a block diagram showing units related to memory for image data storage in the seventh preferred embodiment.

FIG. 21 is a block diagram showing units related to memory for image data storage in the seventh preferred embodiment.

In FIG. 21, after detecting edges (outlines), which are the boundaries of density change in an image, of ordinarily shot image and camera shake-corrected image, which are stored in the memory 54 for image data storage, the feature point extraction unit 56 extracts feature points by extracting only parts whose features can be discriminated easily, such as a high-intensity point, an end-point, a vertex, a branching point and an intersection, from the edges. Then, the feature point extraction unit 56 determines whether the resolution of the feature points is high and outputs an image with the higher resolution, for example, to the memory in the far later stage, which is not shown in FIG. 21, of the memory 54 for image data storage.

Figure 22:
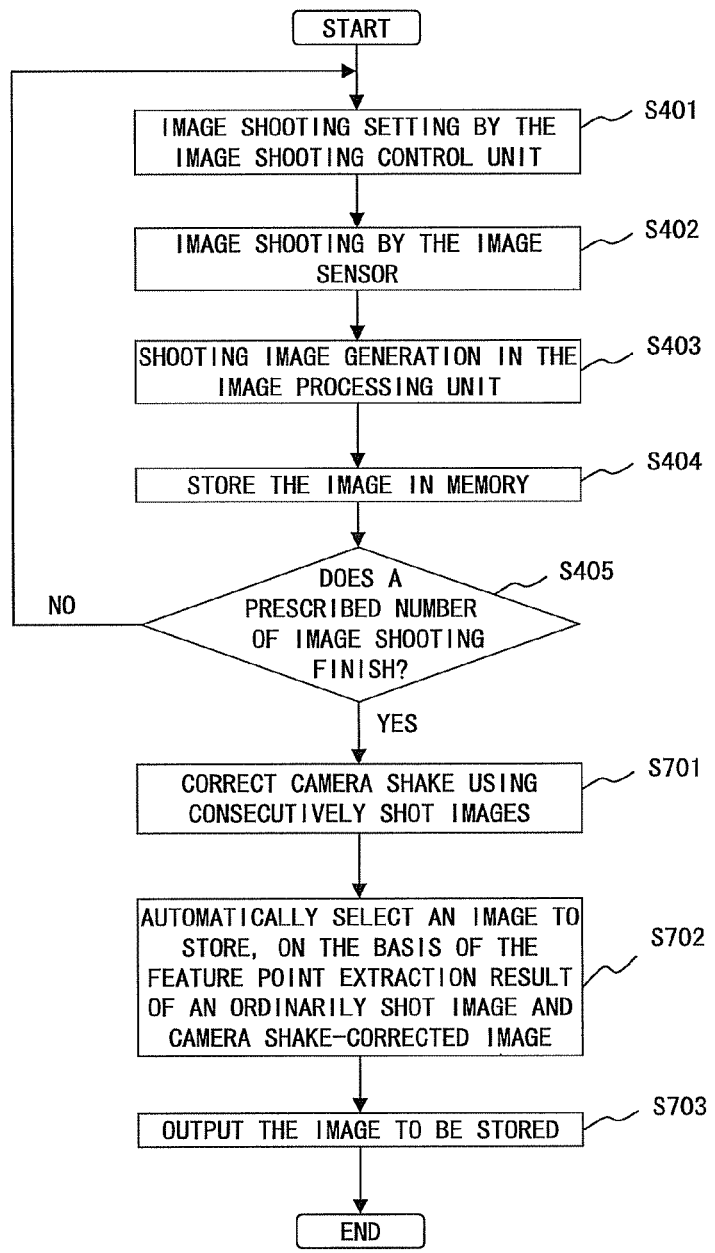
FIG. 22 is a flowchart covering up to the storage process of a taken image from the image shooting process in the seventh preferred embodiment.

FIG. 22 is a flowchart covering up to the storage process of a taken image from the image shooting process in the seventh preferred embodiment.

Since steps S401 through S405 are the same as those shown in FIG. 15, their descriptions are omitted here.

(If in step S405 it is determined that a predetermined number of times plus one time of image shooting is implemented,) in step S701, for example, as shown in FIG. 3, camera shake is corrected on the basis of a plurality of pieces of image data taken in by consecutive exposure for consecutive image shooting and one piece of image data is obtained. Then, the image data is stored in the memory 54 for image data storage.

In step S702, after detecting edges (outlines), which are the boundaries of density change in an image, of ordinarily shot image and camera shake-corrected image, which are stored in the memory 54 for image data storage, the feature point extraction unit 56 extracts feature points by extracting only parts whose features can be discriminated easily, such as a high-intensity point, an end-point, a vertex, a branching point and an intersection, from the edges. Then, the feature point extraction unit 56 determines whether the resolution of the feature points is high and in step S 703 it outputs an image with the higher resolution, for example, to the memory in the far later stage, which is not shown in FIG. 21, of the memory 54 for image data storage.

As described above, in this seventh preferred embodiment, by one image shooting instruction, both ordinarily shot image data and camera shake-corrected image data ate taken in. Then, the feature point extraction unit 56 stores one with the higher resolution in the feature points, of the ordinarily shot image data and camera shake-corrected image data. Thus, image data with better quality, whose influence of camera shake is suppressed, can be obtained.

Although as described above, in the seventh preferred embodiment, feature points are extracted from each image, only edges can also be detected. In this case, it is determined whether the resolution of the edge is high and an image with the higher resolution is outputted, for example, to the memory in the far later stage, which is not shown in FIG. 21, of the memory 54 for image data storage.

Figure 23:
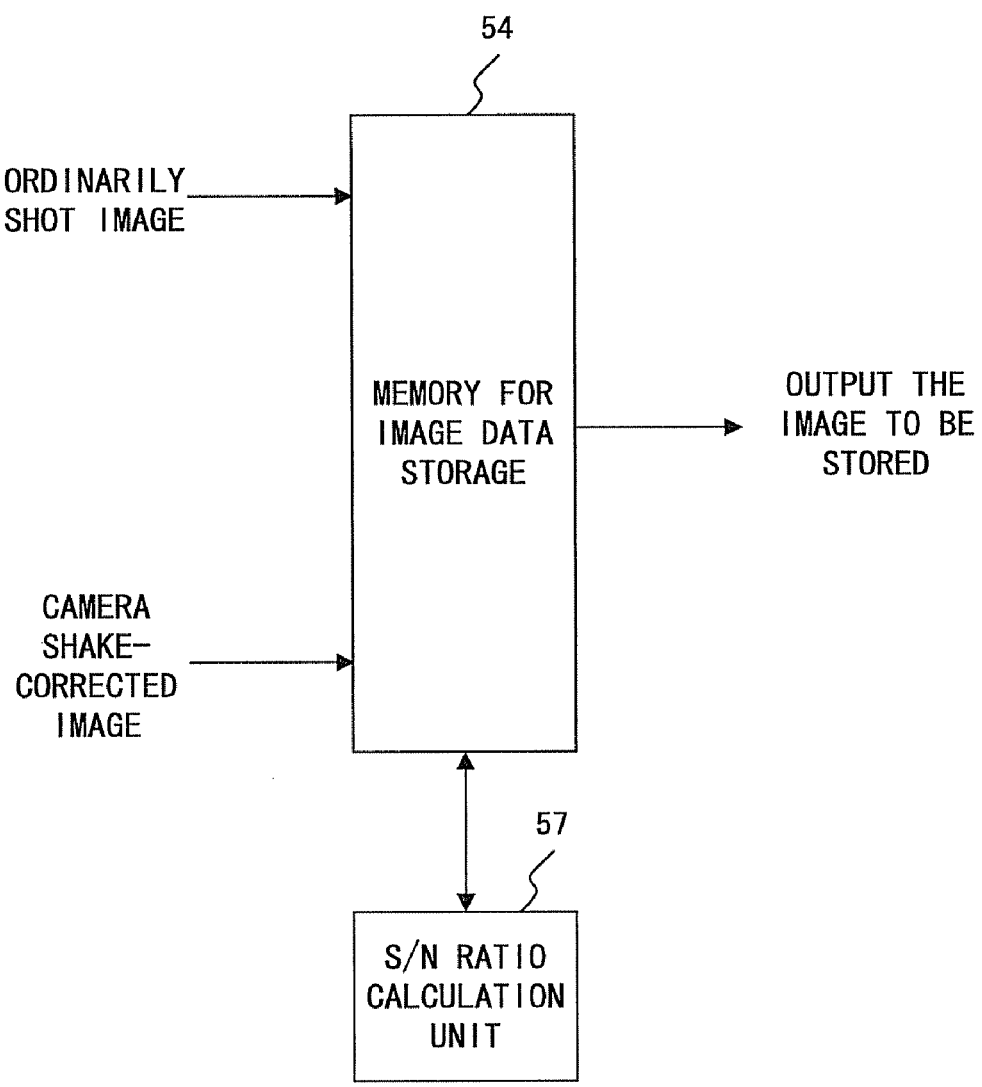
FIG. 23 is a block diagram showing units related to memory for image data storage in the eighth preferred embodiment.

FIG. 23 is a block diagram showing units related to memory for image data storage in the eighth preferred embodiment.

In FIG. 23, the S/N ratio calculation unit 57 calculates the S/N ratio, that is, a value obtained by dividing a necessary signal level by a noise level included in the signal, for each of ordinarily shot image and camera shake-corrected image, which are stored in the memory 54 for image data storage and outputs an image with the higher S/N ratio, for example, to the memory in the far later stage, which is not shown in FIG. 23, of the memory 54 for image data storage.

Figure 24:
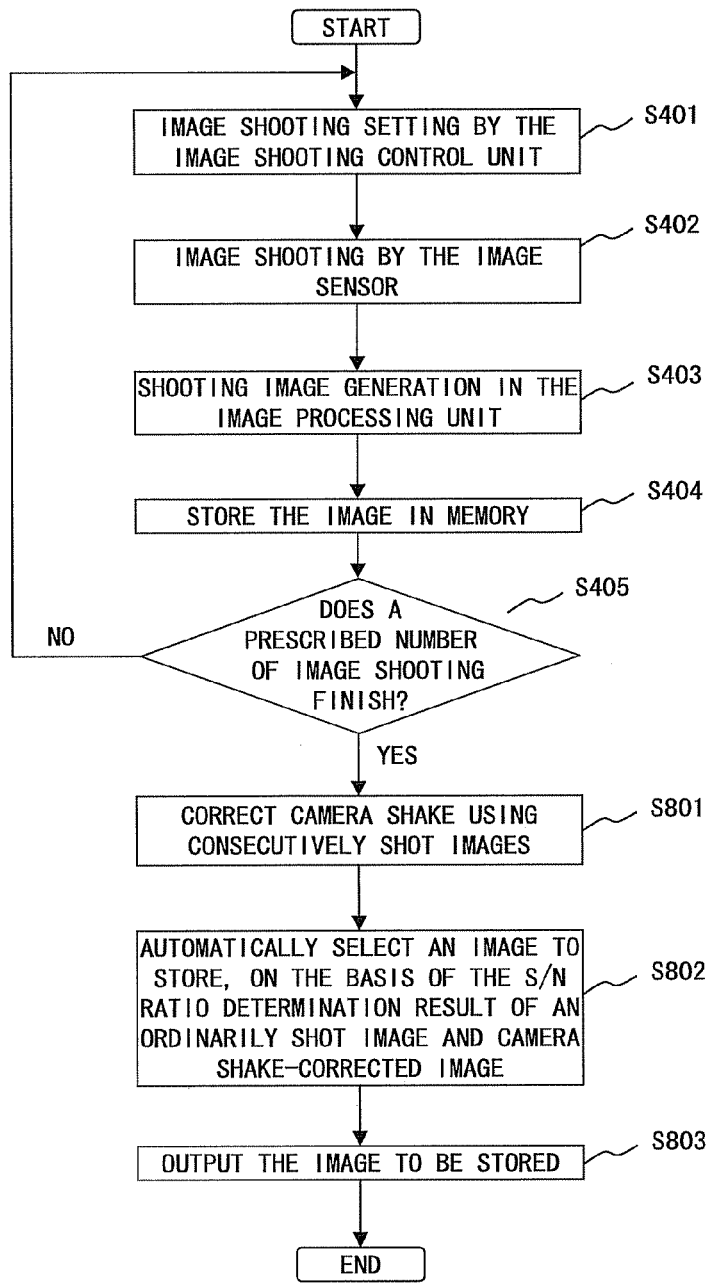
FIG. 24 is a flowchart covering up to the storage process of a taken image from the image shooting process in the eighth preferred embodiment.

FIG. 24 is a flowchart covering up to the storage process of a taken image from the image shooting process in the eighth preferred embodiment.

Since steps S401 through S405 are the same as those shown in FIG. 15, their descriptions are omitted here.

(If in step S405 it is determined that a predetermined number of times plus one time of image shooting is implemented,) in step S801, for example, as shown in FIG. 3, camera shake is corrected on the basis of a plurality of pieces of image data taken in by consecutive exposure for consecutive image shooting and one piece of image data is obtained. Then, the image data is stored in the memory 54 for image data storage.

In step S802, the S/N ratio calculation unit 57 calculates the S/N ratio, that is, a value obtained by dividing a necessary signal level by a noise level included in the signal, for each of ordinarily shot image and camera shake-corrected image which are stored in the memory 54 for image data storage. In step S803, the S/N ratio calculation unit 57 outputs an image with the higher S/N ratio, for example, to the memory in the far later stage, which is not shown in FIG. 23, of the memory 54 for image data storage.

As described above, in the eighth preferred embodiment, by one image shooting instruction, both ordinarily shot image data and camera shake-corrected image data ate taken in. Then, the S/N ratio calculation unit 57 stores image data with the higher S/N ratio, which is a value obtained by dividing a necessary signal level by a noise level included in the signal, of the ordinarily shot image data and camera shake-corrected image data. Thus, image data with better quality, whose influence of camera shake is suppressed, can be obtained.

The image shooting device can also comprise both the feature point extraction unit 56 and the S/N ratio calculation unit 57. In this case, a user determines whether priority is given to blur correction by feature-point extraction via a switch attached on a device such as a cellular phone in which the image shooting device is built or via the user interface unit 55. If priority is given to blur correction, the process of the seventh preferred embodiment is performed. If no priority is given to blur correction, the process of the eighth preferred embodiment is performed.

Figure 25:
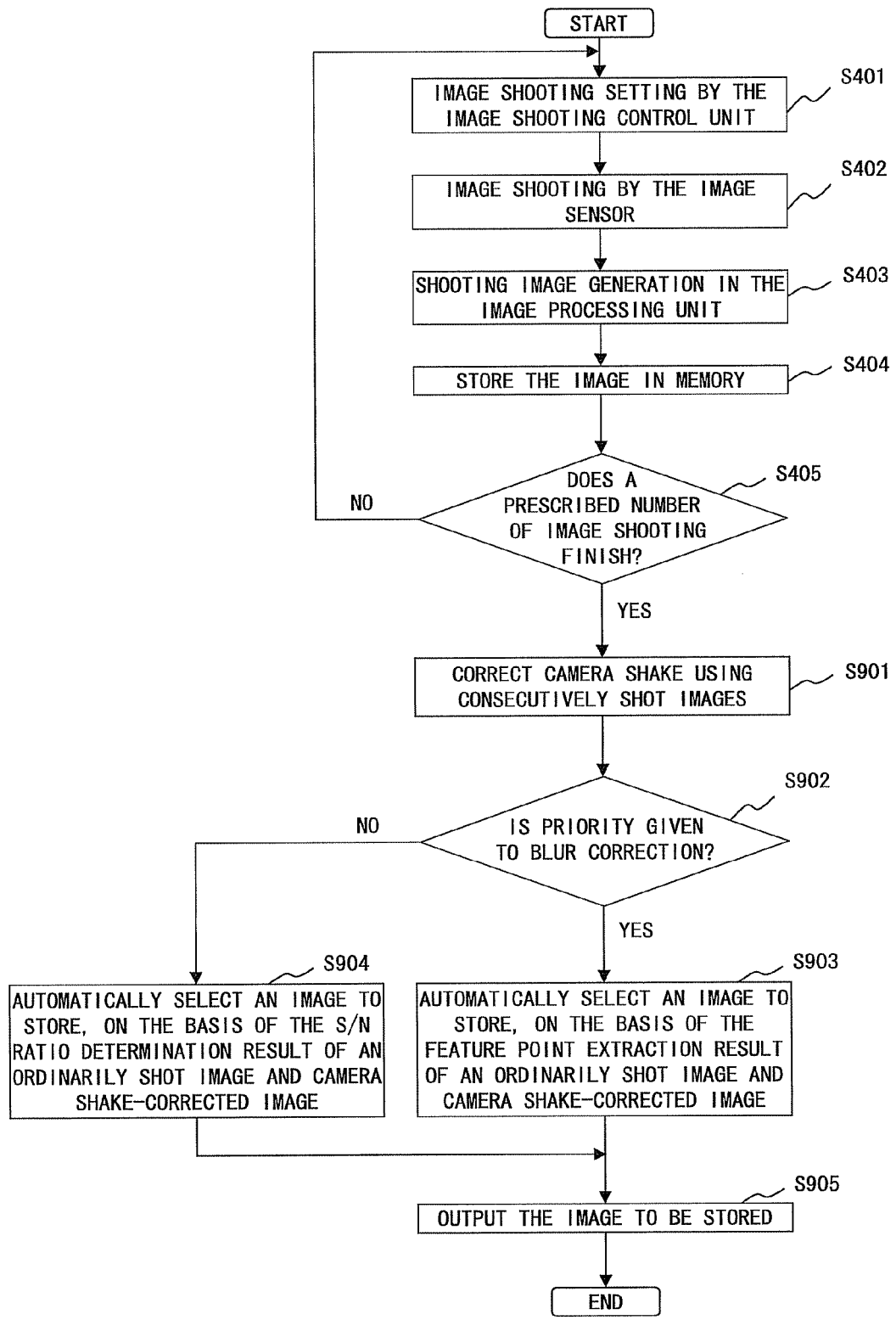
FIG. 25 is the combined flowchart of the seventh and eighth preferred embodiments.

FIG. 25 is the combined flowchart of the seventh and eighth preferred embodiments.

Since steps S401 through S405 are the same as those shown in FIG. 15, their descriptions are omitted here.

(If in step S405 it is determined that a predetermined number of times plus one time of image shooting is implemented,) in step S901, for example, as shown in FIG. 3, camera shake is corrected on the basis of a plurality of pieces of image data taken in by exposure for consecutive image shooting and one piece of image data is obtained. Then, the image data is stored in the memory 54 for image data storage.

In step S902 it is determined whether the current mode is a "blur correction priority mode".

If in step S902 it is determined that the current mode is a "blur correction priority mode", in step S903, after detecting edges (outlines), which are the boundaries of density change in an image, of ordinarily shot image and camera shake-corrected image, which are stored in the memory 54 for image data storage, the feature point extraction unit 56 extracts feature points by extracting only parts whose features can be discriminated easily, such as a high-intensity point, an end-point, a vertex, a branching point and an intersection, from the edges. Then, the feature point extraction unit 56 determines whether the resolution of the feature points is high and in step S905 it outputs an image with the higher resolution, for example, to the memory in the far later stage, which is not shown in FIGS. 21 nor 23, of the memory 54 for image data storage.

If in step S902 it is not determined that the current mode is a "blur correction priority mode", in step S904, the S/N ratio calculation unit 57 calculates the S/N ratio, that is, a value obtained by dividing a necessary signal level by a noise level included in the signal, for each of ordinarily shot image and camera shake-corrected image which are stored in the memory 54 for image data storage. In step S905, the S/N ratio calculation unit 57 outputs an image with the higher S/N ratio, for example, to the memory in the far later stage, which is not shown in FIGS. 21 nor 23, of the memory 54 for image data storage.

Figure 26:
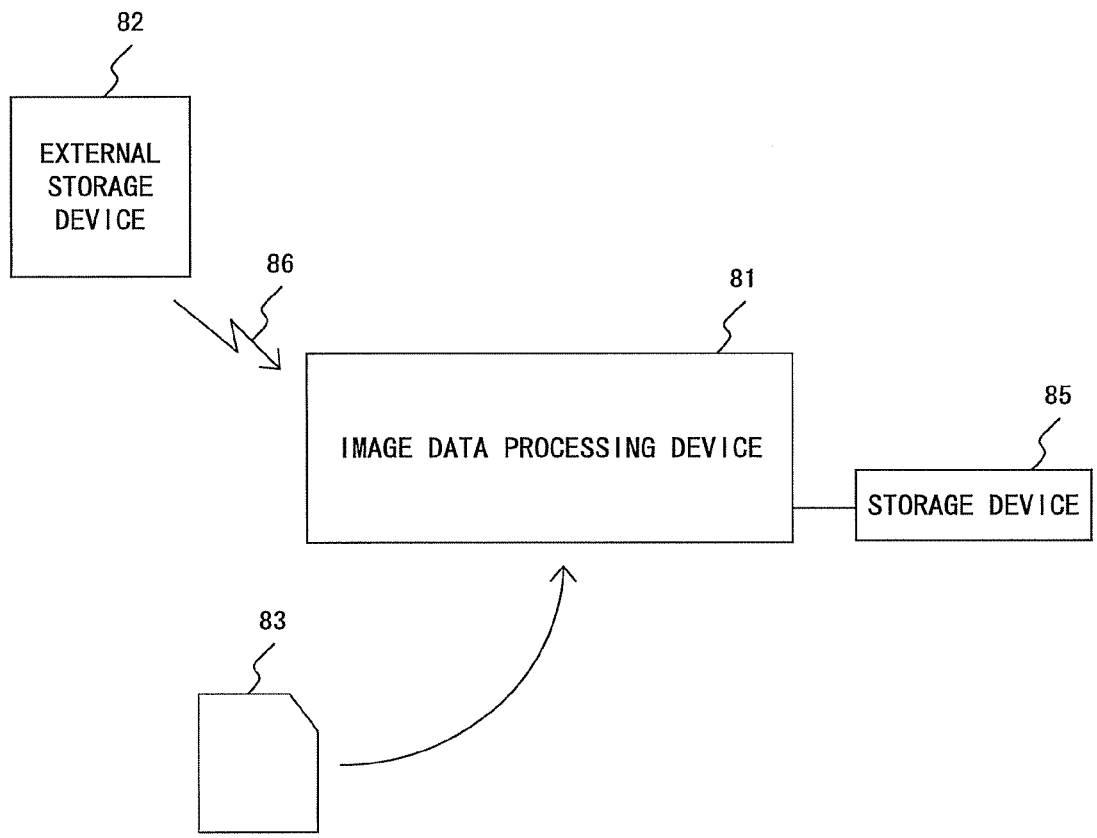
FIG. 26 shows examples of storage media.

FIG. 26 shows examples of storage media.

The pre-process of the camera shake correction process and the determination process determining an image to be stored according to the present invention can be realized by an image data processing device 81. A program and data for the process of the present invention can be loaded from the storage device 85 onto the memory, of the image data processing device 81 and be executed. Alternatively, the program and data can also be loaded from a portable storage medium 83 onto the memory of the image data processing device 81 and be executed. Alternatively, the program and data can also be loaded from an external storage device 82 onto the memory of the image data processing device 81 via a network 86 and be executed.

What is claimed is:

1. An image shooting device with a camera shake correction function, comprising:
    an image sensor configured to photo-electrically convert light received from a shooting target for a specified exposure time and configured to output photo-electrically converted data;
    an image data generation unit configured to generate image data on the basis of the photo-electrically converted data;
    an image shooting control unit configured to output exposure control information to the image sensor according to a image shooting instruction and configured to take in one or more pieces of image data;
    a correction unit configured to generate one piece of image data whose camera shake is corrected, on the basis of a plurality of pieces of taken image data;
    an exposure control unit configured to calculate the exposure time and a gain value indicating how much to amplify the photo-electrically converted data as the exposure control information; and
    a determination unit configured to determine whether a set digital zoom magnification value is equal to or more than a predetermined threshold,
    wherein
        if it is determined that the digital zoom magnification value is equal to or more than the threshold, the image shooting control unit takes in one piece of image data for ordinary image shooting, and
        if it is determined that the digital zoom magnification value is less than the threshold, the image shooting control unit takes in a plurality of pieces of image data for camera shake correction.

2. The image shooting device with the camera shake correction function according to claim 1, wherein the threshold is set in the neighborhood of a starting position of a range of digital zoom magnification, where a blur due to camera shake correction based on a plurality of pieces of image data, by overlapping of a plurality of images, remarkably expands.

3. An image shooting device with a camera shake correction function, comprising:
    an image sensor configured to photo-electrically convert light received from a shooting target for a specified exposure time and configured to output photo-electrically converted data;
    an image data generation unit configured to generate image data on the basis of the photo-electrically converted data;
    an image shooting control unit configured to output exposure control information to the image sensor according to a image shooting instruction and configured to take in one or more pieces of image data;
    a correction unit configured to generate one piece of image data whose camera shake is corrected, on the basis of a plurality of pieces of taken image data;
    an exposure control unit configured to calculate the exposure time and a gain value indicating how much to amplify the photo-electrically converted data;
    an exposure time threshold value acquisition unit configured to obtain an exposure time threshold corresponding to a set digital zoom magnification on the basis of a zoom magnification/exposure time threshold storage unit configured to store allowable exposure time thresholds for digital zoom magnification values; and
    a determination unit configured to determine whether the calculated exposure time is equal to or less than the obtained exposure time threshold,
    wherein
        if it is determined that the calculated exposure time is equal to or less than the obtained exposure time threshold, the image shooting control unit takes in one piece of image data for ordinary image shooting;
        if it is determined that the calculated exposure time is more than the obtained exposure time threshold, the image shooting control unit takes in a plurality of pieces of image data for camera shake correction;
        each of the exposure time thresholds is specified in the zoom magnification/exposure time threshold storage unit in such a way that each of the exposure time thresholds
            corresponds to each of the digital zoom magnification values equal to or less than a predetermined value and is in inverse proportion to the corresponding digital zoom magnification value; and
        the predetermined value defines a range where a blur due to camera shake correction based on a plurality of pieces of image data, specifically, due to overlapping of a plurality of images, does not remarkably expands.

4. The image shooting device with the camera shake correction function according to claim 3, wherein when the image shooting control unit takes in a plurality of N pieces of image data for camera shake correction, the exposure control unit calculates each exposure time for each of the plurality of N pieces of image data to be 1/N of an exposure time for taking one piece of image data for ordinary image shooting.

5. A camera shake correction method, comprising:
    photo-electrically converting light received from a shooting target for a specified exposure time using an image sensor;
    outputting photo-electrically converted data;
    generating image data on the basis of the photo-electrically converted data;
    outputting exposure control information to the image sensor according to an image shooting instruction;
    taking in one or more pieces of image data;
    generating one piece of image data whose camera shake is corrected on the basis of a plurality of pieces of taken image data;
    calculating the exposure time and a gain value indicating how much to amplify the photo-electrically converted data; and
    determining whether a set digital zoom magnification value is equal to or more than a predetermined threshold,
    wherein
        if it is determined that the digital zoom magnification value is equal to or more than the threshold, one piece of image data for ordinary image shooting is taken in; and
        if it is determined that the digital zoom magnification value is less than the threshold, a plurality of pieces of image data for camera shake correction is taken in.

6. A camera shake correction methods, comprising:
    photo-electrically converting light received from a shooting target for a specified exposure time using an image sensor;
    outputting photo-electrically converted data;
    generating image data on the basis of the photo-electrically converted data;
    outputting exposure control information to the image sensor according to an image shooting instruction;

taking in one or more pieces of image data;

generating one piece of image data whose camera shake is corrected on the basis of a plurality of pieces of taken image data;

calculating the exposure time and a gain value indicating how much to amplify the photo-electrically converted data;

an exposure time threshold acquisition step of obtaining an exposure time threshold corresponding to a set digital zoom magnification on the basis of a zoom magnification/exposure time threshold storage unit configured to store allowable exposure time thresholds for digital zoom magnification values; and determining whether the calculated exposure time is equal to or less than the obtained exposure time threshold, wherein if it is determined that the calculated exposure time is equal to or less than the obtained exposure time threshold, one piece of image data for ordinary image shooting is taken in;

if it is determined that the calculated exposure time is more than the obtained exposure time threshold, a plurality of pieces of image data for camera shake correction is taken in;

each of the exposure time thresholds is specified in the zoom magnification/exposure time threshold storage unit in such a way that each of the exposure time thresholds corresponds to each of the digital zoom magnification values equal to or less than a predetermined value and is in inverse proportion to the corresponding digital zoom magnification value; and the predetermined value defines a range where a blur due to camera shake correction based on a plurality of pieces of image data, specifically, due to overlapping of a plurality of images, does not remarkably expands.

7. The camera shake correction method according to claim 6, wherein when a plurality of N pieces of image data for camera shake correction is taken in, each exposure time for each of the plurality of N pieces of image data is calculated to be 1/N of an exposure time for taking one piece of image data for ordinary image shooting.

* * * * *

UNITED STATES PATENT AND TRADEMARK OFFICE
CERTIFICATE OF CORRECTION

PATENT NO. : 7,680,402 B2
APPLICATION NO. : 11/562702
DATED : March 16, 2010
INVENTOR(S) : Kaoru Chujo It is certified that error appears in the above-identified patent and that said Letters Patent is hereby corrected as shown below:

Column 21, Line 43, change "data," to --data--.

Column 22, Line 59, change "methods," to --method,--.

Column 23, Line 8, before "obtaining" delete "an exposure time threshold acquisition step of".

Signed and Sealed this

First Day of June, 2010

David J. Kappos
*Director of the United States Patent and Trademark Office*

UNITED STATES PATENT AND TRADEMARK OFFICE
CERTIFICATE OF CORRECTION

PATENT NO.       : 7,680,402 B2
APPLICATION NO.  : 11/562702
DATED            : March 16, 2010
INVENTOR(S)      : Kaoru Chujo et al.

It is certified that error appears in the above-identified patent and that said Letters Patent is hereby corrected as shown below:

On the Title Page, Item (54) (Title), Lines 1-2, change "IMAGE SHOOTING DEVICE WITH CAMERA SHARE CORRECTION FUNCTION" to --IMAGE SHOOTING DEVICE WITH CAMERA SHAKE CORRECTION FUNCTION, CAMERA SHAKE CORRECTION METHOD AND STORAGE MEDIUM RECORDING PRE-PROCESS PROGRAM FOR CAMERA SHAKE CORRECTION PROCESS--.

Column 1, Lines 1-2, change "IMAGE SHOOTING DEVICE WITH CAMERA SHARE CORRECTION FUNCTION" to --IMAGE SHOOTING DEVICE WITH CAMERA SHAKE CORRECTION FUNCTION, CAMERA SHAKE CORRECTION METHOD AND STORAGE MEDIUM RECORDING PRE-PROCESS PROGRAM FOR CAMERA SHAKE CORRECTION PROCESS--.

Signed and Sealed this

Fourteenth Day of December, 2010

David J. Kappos
*Director of the United States Patent and Trademark Office*